(12) United States Patent
Brown et al.

(10) Patent No.: US 10,024,484 B2
(45) Date of Patent: Jul. 17, 2018

(54) TENSILE PARALLELOGRAM ARM

(71) Applicants: Garrett W. Brown, Philadelphia, PA (US); Jerry Holway, Exton, PA (US)

(72) Inventors: Garrett W. Brown, Philadelphia, PA (US); Jerry Holway, Exton, PA (US)

(*) Notice: Subject to any disclaimer, the term of this patent is extended or adjusted under 35 U.S.C. 154(b) by 0 days.

(21) Appl. No.: 15/525,545

(22) PCT Filed: Nov. 13, 2015

(86) PCT No.: PCT/US2015/060661
§ 371 (c)(1),
(2) Date: May 9, 2017

(87) PCT Pub. No.: WO2016/077743
PCT Pub. Date: May 19, 2016

(65) Prior Publication Data
US 2017/0328512 A1     Nov. 16, 2017

Related U.S. Application Data

(60) Provisional application No. 62/080,721, filed on Nov. 17, 2014, provisional application No. 62/080,372, filed on Nov. 16, 2014.

(51) Int. Cl.
*F16M 13/00* (2006.01)
*F16M 11/04* (2006.01)
*F16M 11/10* (2006.01)
*F16M 11/20* (2006.01)
*F16M 13/02* (2006.01)
*F16M 11/24* (2006.01)

(52) U.S. Cl.
CPC ......... *F16M 11/041* (2013.01); *F16M 11/105* (2013.01); *F16M 11/2064* (2013.01); *F16M 11/24* (2013.01); *F16M 13/022* (2013.01)

(58) Field of Classification Search
CPC .............. F16M 11/041; F16M 11/105; F16M 11/2064; F16M 11/24; F16M 13/022; A61B 5/04004
USPC .................................. 248/276.1, 280.11, 585
See application file for complete search history.

(56) References Cited

U.S. PATENT DOCUMENTS

| | | |
|---|---|---|
| 3,333,613 A | 8/1967 | Bosse et al. |
| 3,449,769 A | 6/1969 | Mizen |
| 3,694,888 A | 10/1972 | Bosse |
| 3,820,752 A | 6/1974 | Oram |
| 4,017,168 A | 4/1977 | Brown |
| 4,156,512 A | 5/1979 | Brown |
| 4,158,490 A | 6/1979 | Gottshalk et al. |
| 4,160,536 A | 7/1979 | Krosgrud |
| 4,206,983 A | 6/1980 | Nettman et al. |

(Continued)

FOREIGN PATENT DOCUMENTS

DE     4407303 A1     9/1995

OTHER PUBLICATIONS

PCT International Search Report and Written Opinion dated Nov. 16, 2014 for International Application No. PCT/US2015/060661.

*Primary Examiner* — Todd M Epps
(74) *Attorney, Agent, or Firm* — Barnes & Thornburg LLP; Joan T. Kluger, Esq.

(57) ABSTRACT

A tensile parallelogram arm that mimics parallelogram counterbalancing structures and which can be folded into a compact form. The assembly includes a gimbal to which a supported payload is attached.

20 Claims, 19 Drawing Sheets

(56) References Cited

U.S. PATENT DOCUMENTS

| | | | |
|---|---|---|---|
| 4,208,028 A | 6/1980 | Brown et al. | |
| 4,394,075 A | 7/1983 | Brown et al. | |
| 4,474,439 A | 10/1984 | Brown | |
| 4,568,052 A * | 2/1986 | Solomon | B41J 29/15 |
| | | | 248/281.11 |
| RE32,213 E | 7/1986 | Brown | |
| 4,685,649 A | 8/1987 | McKay | |
| 4,695,024 A | 9/1987 | Haven | |
| D302,866 S | 8/1989 | De Lucchi | |
| 4,946,272 A | 8/1990 | Brown | |
| 5,037,053 A | 8/1991 | Fox et al. | |
| 5,098,182 A | 3/1992 | Brown | |
| 5,109,736 A | 5/1992 | Dixon | |
| 5,163,649 A | 11/1992 | Schehr | |
| 5,229,798 A | 7/1993 | Brown | |
| 5,360,196 A | 11/1994 | DiGiulio et al. | |
| 5,389,987 A | 2/1995 | Corbeil | |
| D358,832 S | 5/1995 | Lenney | |
| 5,435,515 A | 7/1995 | DiGiulio et al. | |
| 5,509,630 A | 4/1996 | Bringuier | |
| 5,538,214 A * | 7/1996 | Sinila | A61B 5/04004 |
| | | | 248/278.1 |
| 5,544,554 A | 8/1996 | Brightly | |
| 5,579,071 A | 11/1996 | Wetzel | |
| 5,609,316 A | 3/1997 | Tigliev | |
| 6,030,130 A | 2/2000 | Paddock et al. | |
| 6,188,849 B1 | 2/2001 | Staicouras | |
| 6,293,676 B1 | 9/2001 | Holway | |
| 6,377,011 B1 | 4/2002 | Ben-Ur | |
| 6,711,972 B1 | 3/2004 | Joyner et al. | |
| 6,896,230 B2 | 5/2005 | Cvek | |
| 7,055,789 B2 | 6/2006 | Libbey et al. | |
| 7,207,537 B2 * | 4/2007 | Hung | F16M 11/10 |
| | | | 248/274.1 |
| 7,412,776 B2 * | 8/2008 | Iikubo | A61B 8/4218 |
| | | | 248/280.11 |
| 7,437,936 B1 * | 10/2008 | Bessette | G01K 1/08 |
| | | | 361/283.1 |
| 7,562,851 B2 | 7/2009 | Hien | |
| 7,618,016 B2 | 11/2009 | Brown | |
| 7,628,068 B2 * | 12/2009 | Bessette | G01D 11/24 |
| | | | 220/200 |
| 7,931,412 B2 | 4/2011 | Brown | |
| 8,066,251 B2 | 11/2011 | Brown | |
| 8,142,083 B2 * | 3/2012 | Brown | F16M 11/2035 |
| | | | 352/243 |
| 8,342,467 B2 * | 1/2013 | Stachowski | A61B 8/00 |
| | | | 248/280.11 |
| 8,469,323 B1 * | 6/2013 | Deros | F16M 11/105 |
| | | | 248/123.11 |
| 8,506,180 B2 | 8/2013 | Brown | |
| 8,777,172 B2 * | 7/2014 | Sapper | F16M 11/08 |
| | | | 248/274.1 |
| 8,801,319 B2 | 8/2014 | Brown et al. | |
| 9,204,730 B2 | 12/2015 | Brown | |
| 9,404,618 B2 | 8/2016 | Brown et al. | |
| 9,706,843 B2 * | 7/2017 | Hung | A47B 97/001 |
| 2004/0026584 A1 | 2/2004 | Libbey et al. | |
| 2006/0231700 A1 | 10/2006 | Orf et al. | |
| 2007/0019330 A1 | 1/2007 | Wolfersberger | |
| 2007/0080275 A1 | 4/2007 | Stachowski et al. | |
| 2008/0046122 A1 | 2/2008 | Manzo | |
| 2010/0278523 A1 | 5/2010 | Brown | |

* cited by examiner

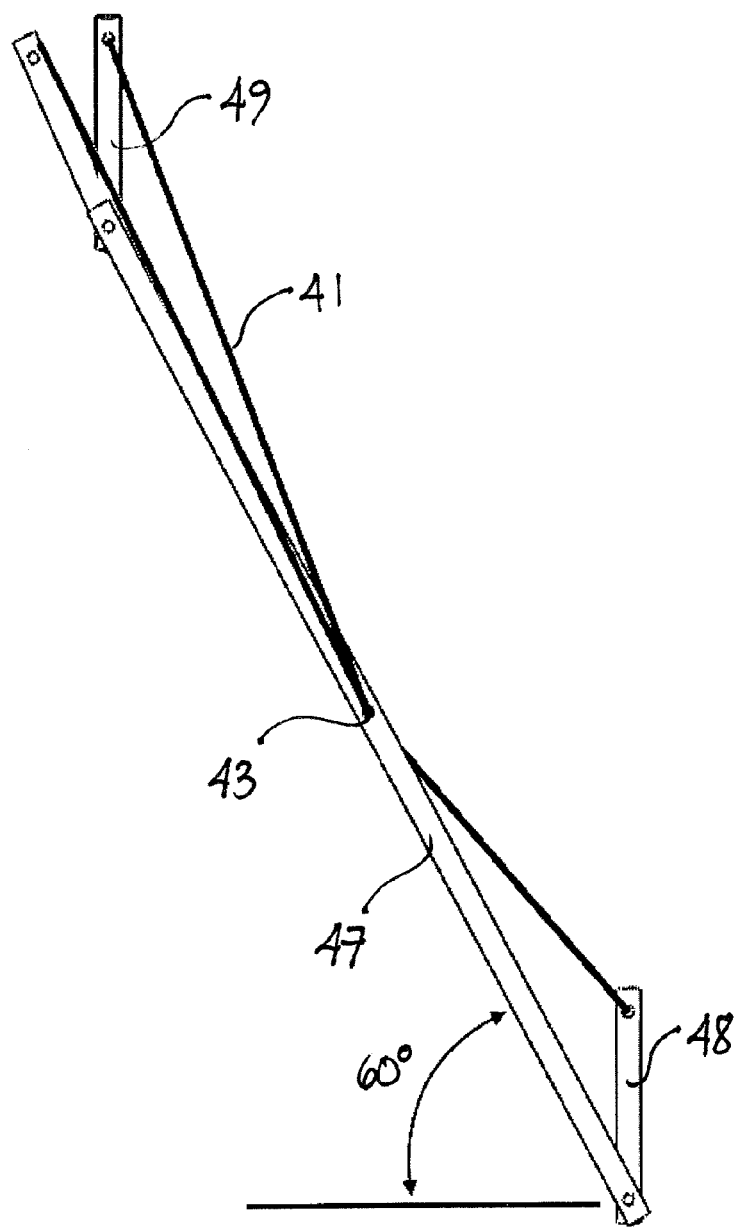
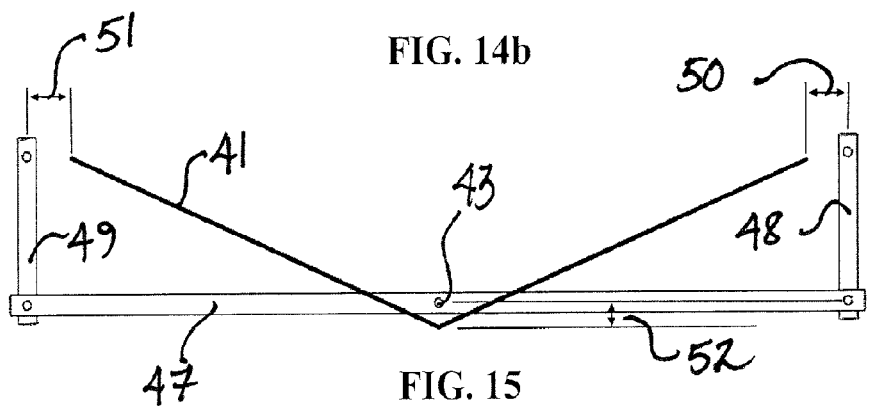
FIG. 14b
FIG. 15

TENSILE PARALLELOGRAM ARM

This application claims priority to U.S. Provisional Application 62/080,372, filed Nov. 16, 2014 and 62/080,721, filed Nov. 17, 2014, both entitled Tensile Parallelogram Arm.

BACKGROUND OF THE INVENTION

Books, electronic readers, computer tablets and other devices displaying visual material require protracted holding or support, positioning and orienting to view the displays.

The optimal viewing angle for the long-term health of the human anatomy is typically between 10° and 20° below ones horizontal 'eye-line'. This is an arduous position for hand-holding, and the 'payload' soon settles down to be braced on lap or table top—neither of which are optimally positioned or angled for reading—and imposes a continual strain on the user's neck vertebrae. Surfaces on which the device can be placed are not always available or located at an optimal height or position.

Therefore, a need exists for a way to 'float' these devices at a convenient position and to readily re-position and re-orient them as the viewer desires.

SUMMARY OF THE INVENTION

An illustrative embodiment of the invention is directed to a tensile parallelogram arm assembly, in which a proximal arm segment assembly and a distal arm segment assembly form, in effect, serially cantilevered suspension-bridge-like structures that emulate parallelogram support arms, a type of counterbalancing arm. The structure is adapted to be folded, preferably into a compact, roughly cylindrical shape.

The term, "parallelogram" as used to describe features of the disclosed tensile arm, is used broadly and does not necessarily mean there are four identifiable parallelogram sides. Although the invention mimics in many ways the functioning of prior art parallelogram arms, there need not be two sets of distinct parallel segments to form a parallelogram structure of the inventive arm. The terms "parallelism" and "parallel" do not necessarily indicate that components are exactly parallel, but will typically include an angular deviation from a true parallel configuration, which will be described further below.

The tensile arm structure is attached to a mounting system such as a three-axis clamp assembly, or to a weighted base. The arm structure can be adjustably positioned to extend varying amounts between the mounting system and the payload. The payload is preferably supported by a gimbal structure that is attached to the tensile parallelogram arm. As used herein, the proximal end is the end closer to the mounting system and the distal end is the end closer to the payload.

The tensile parallelogram arm can be adapted to support payloads such as electronic readers and tablets, mirrors, lights or other objects that need to be fixed in desired positions and observed or worked on from multiple angles. Illustrative embodiments of the tensile parallelogram arm may have greater rigidity than conventional support arms of equivalent mass and do not contain joints that need to be released, re-tightened and locked, although such features can be included.

Although the arm is depicted in illustrative embodiments of the invention as having two 'parallelogram' arm segments or links, the arm structure may contain for example, two or three inventive arm segments and possibly more if desired. An arm with one parallelogram structure as described herein is also possible. The relative position and parallelism of the arm segments is controlled by a tension line terminating at a termination point at or near the top of two approximately parallel uprights and passing through a spar connecting the bottom portions of the uprights. In an illustrative embodiment of the invention, the arm assembly includes two parallelogram segments, each having a pair of uprights, a spar connecting the uprights and a tension line terminating at opposing uprights of the arm segment. Uprights are maintained at a fixed angular relationship around the tensile arm joints. The term "spar" as used herein may include other than a component with a circular cross-section. It is further noted that the term "upright" is used broadly and can include non-vertically-disposed structures. In fact in illustrative embodiments of the invention, the "uprights" at opposing ends of a spar are angled toward each other, but remain substantially at the same relative position to one another, to obtain an analogous effect to conventional counterbalancing or equipoising support arms using parallelogram structures. Parallel uprights refer to the position of a line from the upright pivot to the tension line termination point on the upright, with respect to an analogous line on another upright.

The tension lines are threaded through a central pass-through hole or hook in the spars. The relationship between the pass-through geometry, or other friction component through or around which the tension line passes, and the tension line creates friction when under load that facilitates the arms counterbalancing capabilities. Friction can be increased by incorporating a capstan pin within the pass-through tube. If the arm structure includes more than one arm segment, a pin may be included in one or more of the segments. Inhibiting movement about joints by the addition of a torsion spring can assist in the counter balancing capabilities of the arm structure.

Friction can also be created by torsion springs that increase axial torque. The torsion springs are disposed around one or more arm joints so that the arms can be readily adapted to hold its position. This can be effective even in a zero-g environment, such as a space station. In fact, the uprights and associated tension lines can be multiplied at 120° displacements around the longitudinal axis of a spar so the arm is braced from three angles instead of just one in order to augment sideways as well as vertical rigidity.

Thus, the invention is adapted to maintain position by friction—not continuously in its rotating joints, but rather discontinuously in the supporting and parallelogram-maintaining 'line', which can be readily relieved to permit positioning.

In an illustrative embodiment of the invention, an electrical cable may be run from a charger to a tablet, for example, without re-running cable or requiring extra clips, as tablet position is adjusted within the full lifting and extending range of the support arms.

A resilient component can be added to the tensile parallelogram support arm segment described above to add supportive lift and further reduce the quantity of friction needed to lock position.

The tensile "quasi" parallelograms can be scaled up to suspend and orient heavy payloads such as industrial machinery and medical devices, and may still typically provide better or more desirable rigidity and positional precision compared to conventional arms of equivalent mass.

BRIEF DESCRIPTION OF THE DRAWINGS

The following figures depict illustrative embodiments and features of the invention:

FIG. 7 is a close view of a primary joint, primary upright and proximal spar with a tension line pass-through.

FIG. 15 shows offsets of line attachments and mid line pass-through.

DETAILED DESCRIPTION OF THE DRAWINGS

Figure 1:
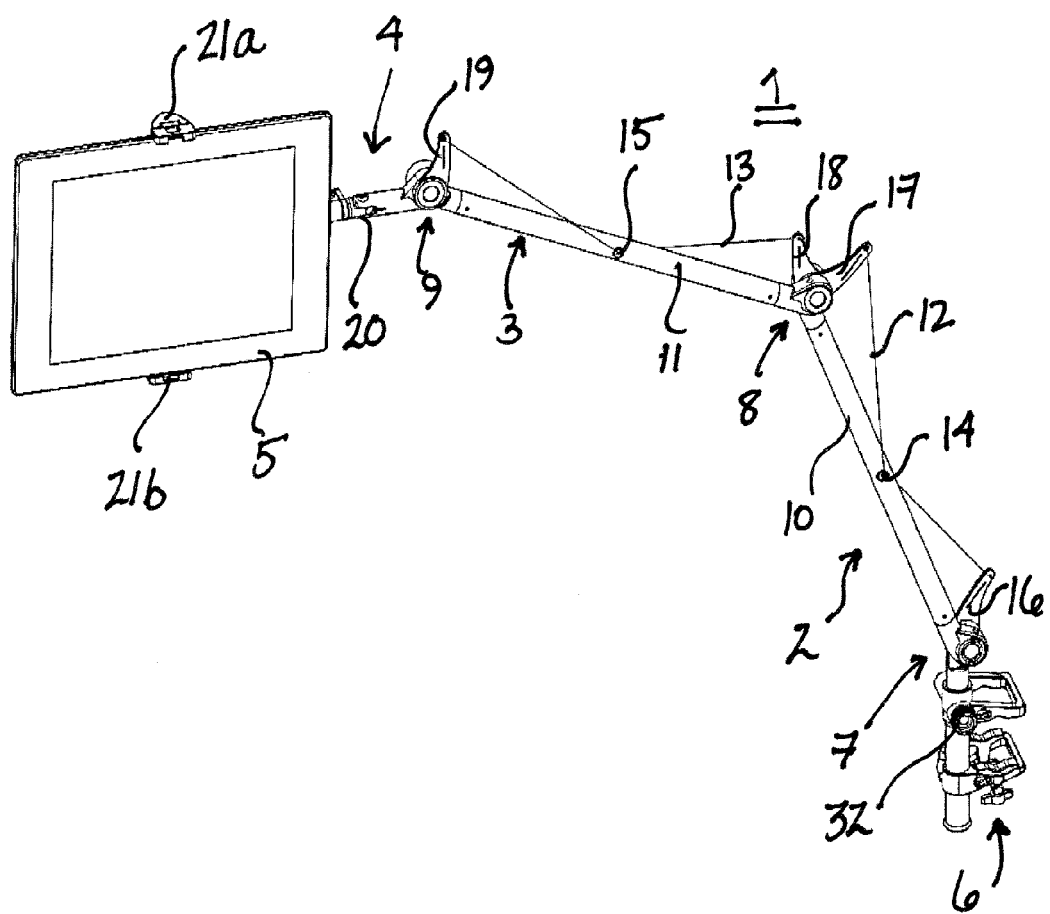
FIG. 1 depicts a tensile parallelogram arm extended with a payload gimbal assembly.

FIG. 1 depicts a tensile parallelogram arm assembly 1 according to an illustrative embodiment of the invention. Proximal assembly 2 and distal assembly 3 form, in effect, serially connected cantilevered bridge-like structures that simulate parallelograms. The arm structure may contain for example, two or three arm segments. Proximal arm assembly 2 is attached to a mounting system, such as a three-axis clamp assembly 6, or to a weighted base. Distal arm assembly 3 is attached to a gimbal assembly 4, which in turn is attached to a payload 5 or the distal arm assembly may be attached to the payload holder. The tensile parallelogram assembly 1 is rotatable with respect to mounting assembly 6. Mounting system 6 may connect to an object in the vicinity of where the payload will be used. The arm structure can be adjustably positioned between mounting system 6 and a payload 5. Tensile parallelogram arm assembly 1 can be adapted to support payloads such as electronic readers and tablets as well as hairdryers, mirrors, lights, pointers, tools, or objects that need to be fixed in desired positions and observed or worked on from multiple angles. Illustrative embodiments of the tensile parallelogram arm may have greater rigidity than conventional support arms of equivalent mass and do not contain joints that need to be released, re-tightened and locked, although such features may be included.

The relative position and parallelism of the arm structure is controlled by proximal tension line 12 and distal tension line 13. Proximal tension line 12 extends from the arm's primary upright 16 to a central pass-through hole 14 in proximal spar 10 and up to first mid upright 17. Distal tension line 13 extends from second mid upright 18, respectively, to a central pass-through hole 15 in distal spar 11 and up to payload upright 19. As used herein, the proximal end of a segment is the end closer to the mounting system and the distal end is the end closer to the payload. The tension lines preferably are a relatively low-stretch or non-stretch material and may be for example a fiber line.

Primary upright 16 is maintained in fixed angular relationship with a primary mounting pin 35 (see FIG. 7) by tab and slot features, for example, as will be described in more detail below, or other rotational limit stops. Proximal segment 2 is positioned by proximal tension line 12, which, in effect, suspends the entire tensile parallelogram arm structure 1 from proximal upright 16. Proximal tension line 12 also maintains parallelism between primary upright 16 and first mid upright 17 by line friction induced at proximal pass-through 14, but only when proximal tension line 12 is tensioned by joint torque produced by either a successive arm segment or, in the case of the distal assembly 3, by torque around payload joint 9 effected on payload upright 19 by the payload weight, as optionally augmented by torsion spring 85, which will be described in more detail below with respect to FIGS. 21 and 22.

Mid upright 17 is mechanically maintained in fixed angular relationship with second mid upright 18, such as by tab and slot features, so that its tension line 13 can likewise suspend its arm assembly and payload. First mid upright 17 is maintained at a fixed angular relationship around mid joint 8 to second mid upright 18, for example by tab and groove features, so that second mid upright 18 maintains a consistent separation distance between the origin of distal tension line 13 and the termination proximal tension line 12 at first mid upright 17. Distal tension line 13 also maintains approximate parallelism between second mid upright 18 and payload upright 19 by line friction induced at its pass-through 15 as if both arm segments 2 and 3 were true serial parallelograms.

Primary upright 16 and payload upright 19 are each in fixed angular relation to fixed joint components 35, 88, respectively. In this illustrative embodiment, fixed joint components 35, 88 are a payload swivel component and primary mounting pin, respectively.

Each arm segment 2, 3 is suspended by the proximal portion of the line tension 12, 13 leading to its respective pass-through hole 14, 15, and the arm segment's uprights 16, 17 or 18, 19 are maintained at a fixed angle to each other by the distal portion of tension lines 12, 13 extending from proximal and distal spar pass-throughs 14, 15 to the distal uprights 17, 19. Each tension line 12, 13 is tensioned by torque around its respective distal upright 17, 19 generated by the weight of the next arm segment or by its cantilevered payload, plus, optionally, torsion spring 85. This tension results in increased friction at pass-throughs 14, 15. Since the taut line is effectively pulling in two directions at pass-throughs 14, 15, a small increase in friction is sufficient to maintain arm position. Electively reducing tension on lines 12, 13 by slightly relieving torque around the distal upright 17, 19, by slightly lifting the subsequent arm section or payload permits line to travel through pass-throughs 14, 15, and thus, alter the arm-angle.

The proximal arm segment 2 can thus be dynamically repositioned up or down if the weight of the distal arm segment 3 is slightly lifted, and line 12 is allowed to freely travel through its pass-through 14—shortening on one side and lengthening on the other. Proximal arm 2 will lock position when line tension is resumed (when, for instance, distal arm 3 is allowed to again apply torque on mid joint 8, proximal tension on proximal line 12, and thus, friction at proximal pass-through 14).

Likewise distal arm 3 can be dynamically repositioned if the weight of its payload plus optional spring torque are momentarily relieved and distal tension line 13 is allowed to freely travel through its pass-through 15. Distal arm 3 will again lock position when payload 5 and torsion spring 85 resume applying torque at payload joint 9, creating tension on proximal line 12, and thus, friction at distal pass-through 15.

Thus, line friction is a product of line tensions that originate with torque produced by payload 5 acting on payload joint 9. That torque tensions distal line 13, which transmits torque through second mid upright 18 and payload upright 19 acting around mid joint 8, and thus, tensioning proximal line 12. This serial tensioning produces the operative friction at pass-throughs 15, 14 required to maintain arm position.

Thus, tensile parallelogram arm assembly 1 is, in effect, a serially cantilevered pair of dynamic suspension bridges, which electively locks positions or is released to move by user interactions that release line friction caused by the substantially 'right angle bends' of pass-through tubes 14, 15. The tension line will have closer to a right angle bend, the smaller the diameter of the pass through since the tension line is angled across the length of the pass through. Proximal arm 2 and distal arm 3 are therefore, simulated parallelograms that function without the joint friction typically relied on to position conventional parallelogram arms. Both proximal assembly 2 and distal assembly 3 will hold their angular positions as long as line frictions are maintained at their respective pass-through apertures 14, 15.

Proximal and distal lines 12, 13, therefore, respectively perform both the suspending function of the springs in conventional force countering arms, and the parallelism function of the missing parallelogram link or side. The result is a novel support arm structure that can, in many cases, be constructed to be lighter and stiffer for a given payload than conventional parallelogram arms. Additionally, in some embodiments the novel arm can be folded co-axially within its own clamp.

Uprights 16, 17, 18, 19, which do not have to be vertical in order to be maintained in parallel arrangement, are connected by swivel joints 7, 8, 9 to permit articulation and extension of serial arm segments 2, 3 as with conventional parallelogram arms As will be described further below with reference to FIG. 21, a motorized windlass or other type of winch, to synchronously take up and release proximate and distal segments of tension lines 12, 13 can be adapted to function at pass-through 14 or 15 on proximal or distal spar 10, 11. In particular, distal spar 10 lends itself to having the motorized device associated with it.

Figure 2:
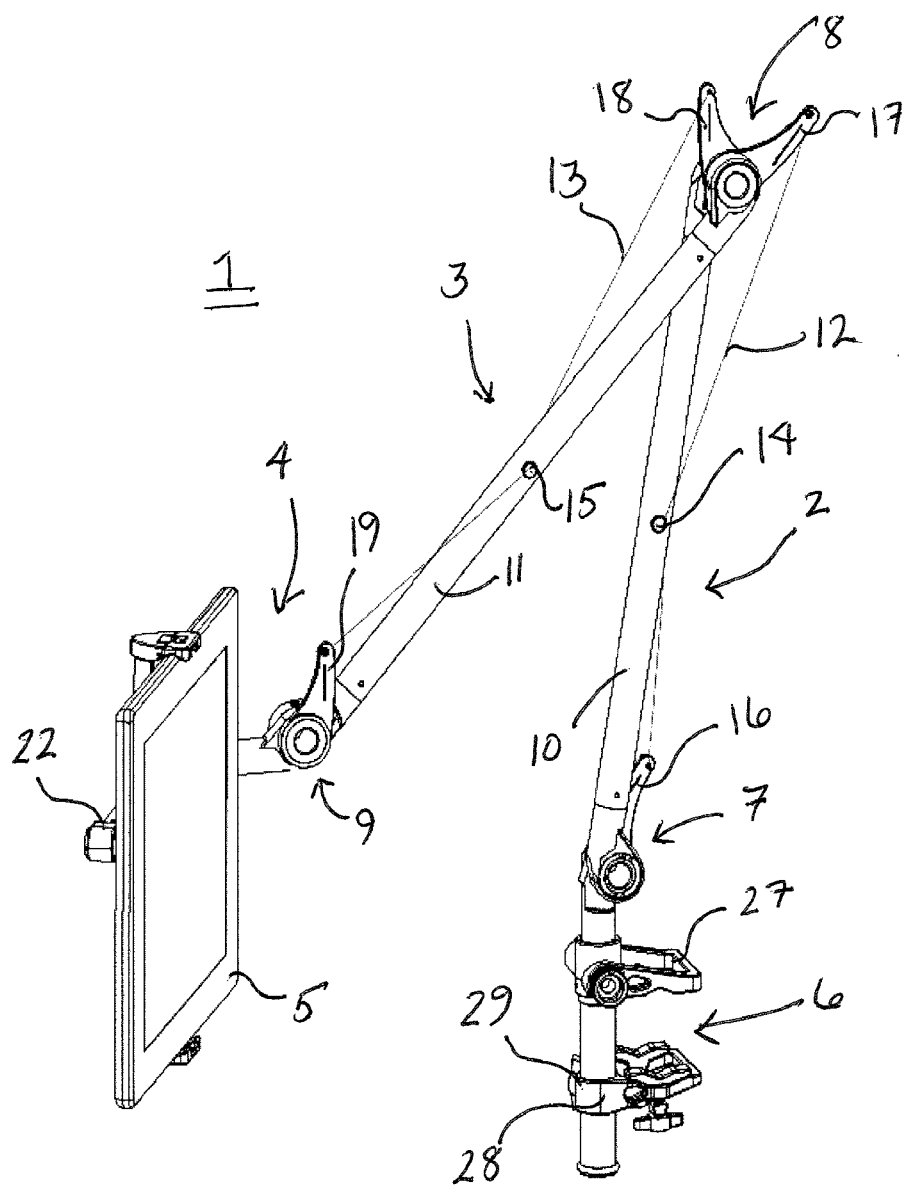
FIG. 2 depicts the tensile parallelogram arm of FIG. 1 adjusted so the payload is closer to the proximal end of the structure.

FIG. 2 shows tensile parallelogram arm assembly 1 adjusted 'up and down' with proximal arm 2 rocked back over clamp assembly 6 and distal arm 3 tucked in toward proximal arm 2. The proximal portion of distal tension line 13 has been previously lengthened and the distal portion shortened, until distal arm 3 assumes an approximately 60° down angle, in this illustrative position. This is accomplished by slightly lifting gimbal assembly 4 until distal line 13 is momentarily slackened and can freely travel through distal pass-through 15.

Figure 3:
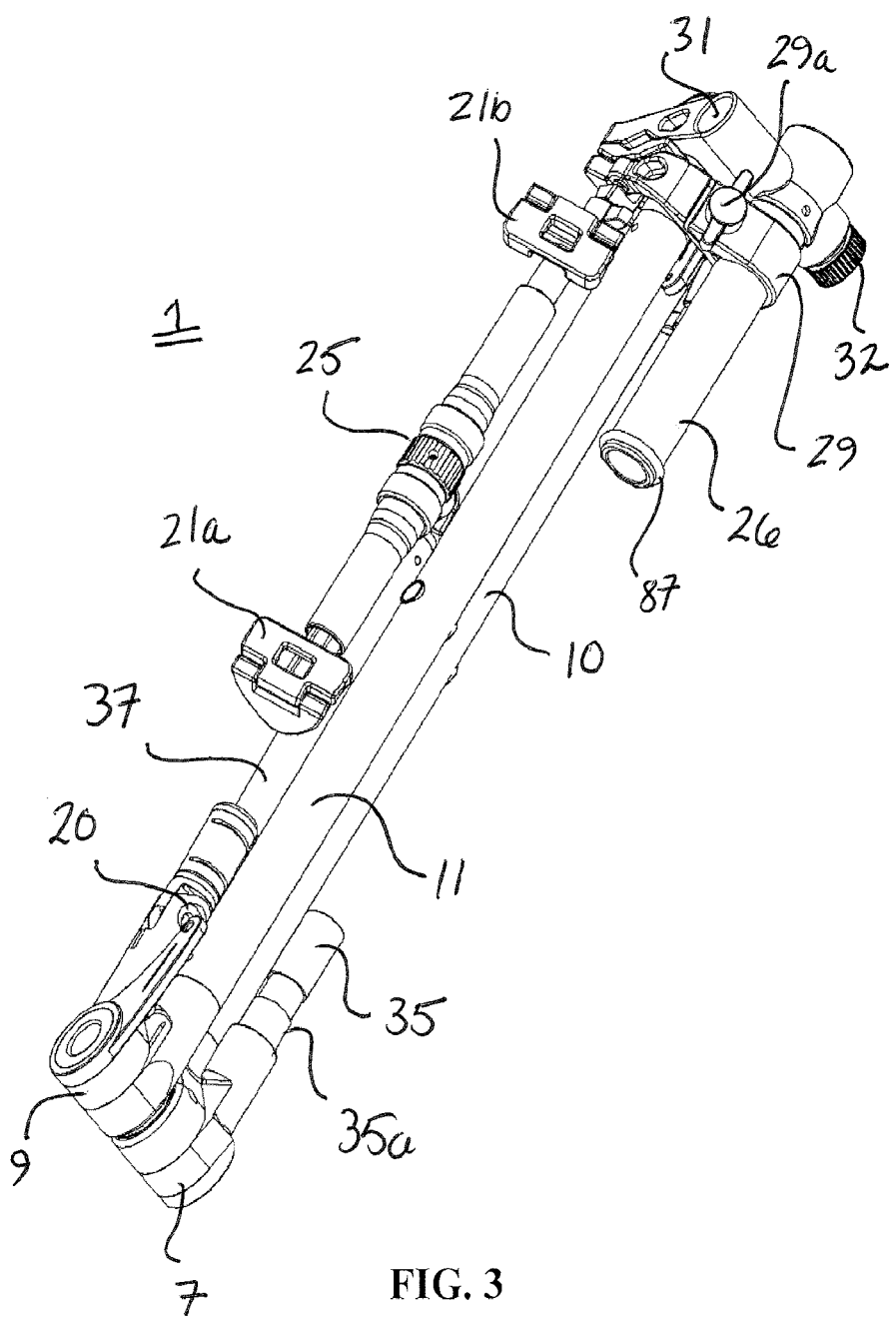
FIG. 3 shows an isometric view of a tensile parallelogram arm assembly in a folded position.
Figure 11:
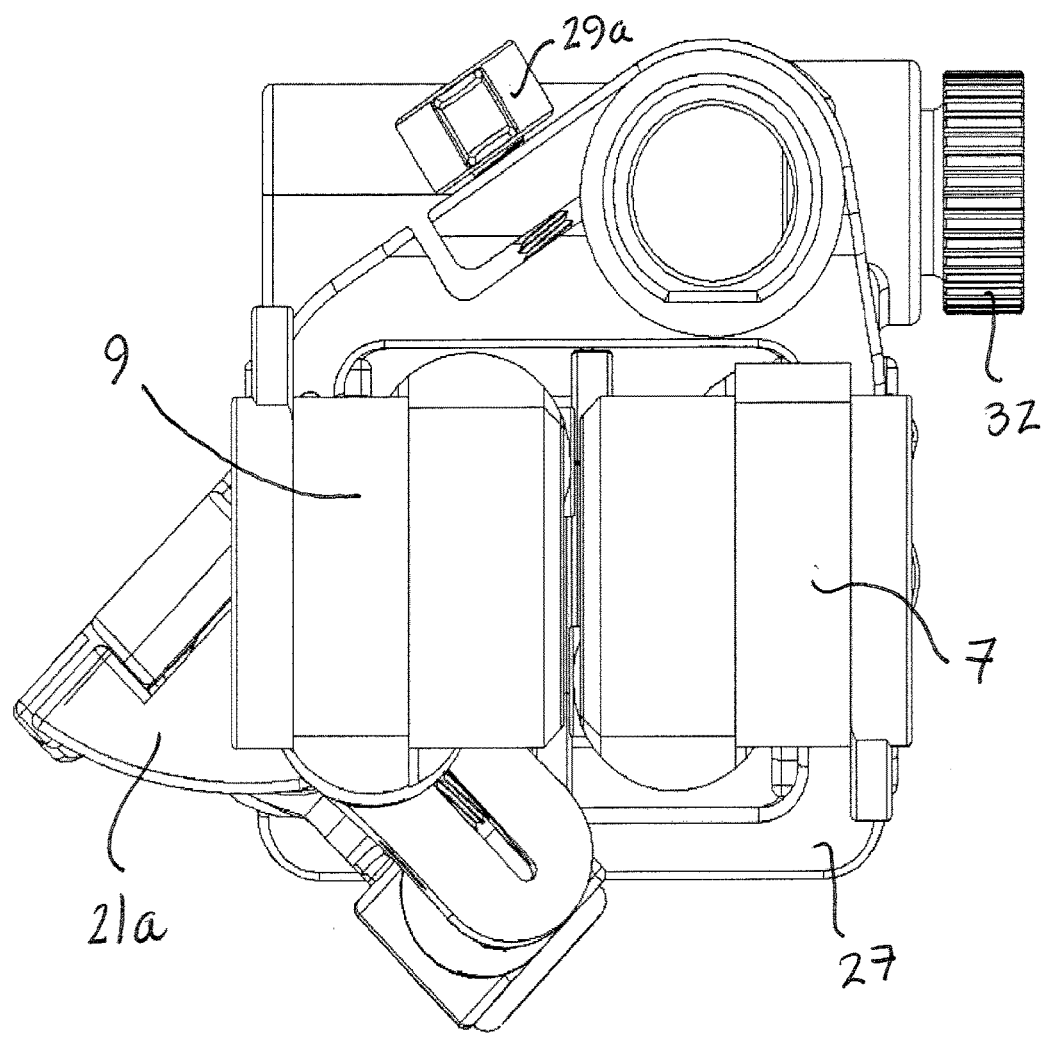
FIG. 11 is an end view of a folded tensile parallelogram arm assembly.

FIGS. 3 and 11 depict tensile parallelogram arm 1 and gimbal assembly 4 in a folded position. FIG. 3 is an isometric view and FIG. 11 is an end view of tensile parallelogram arm assembly 1, both shown in an illustrative folded position. Primary joint 7 and payload joint 9, which in the unfolded position are disposed at the proximal and distal ends of the tensile parallelogram arm assembly 1, respectively, come together in the folded position and with minimal space between them because of relative offsets between distal spars 10, 11 incorporated into joint components.

Figure 24:
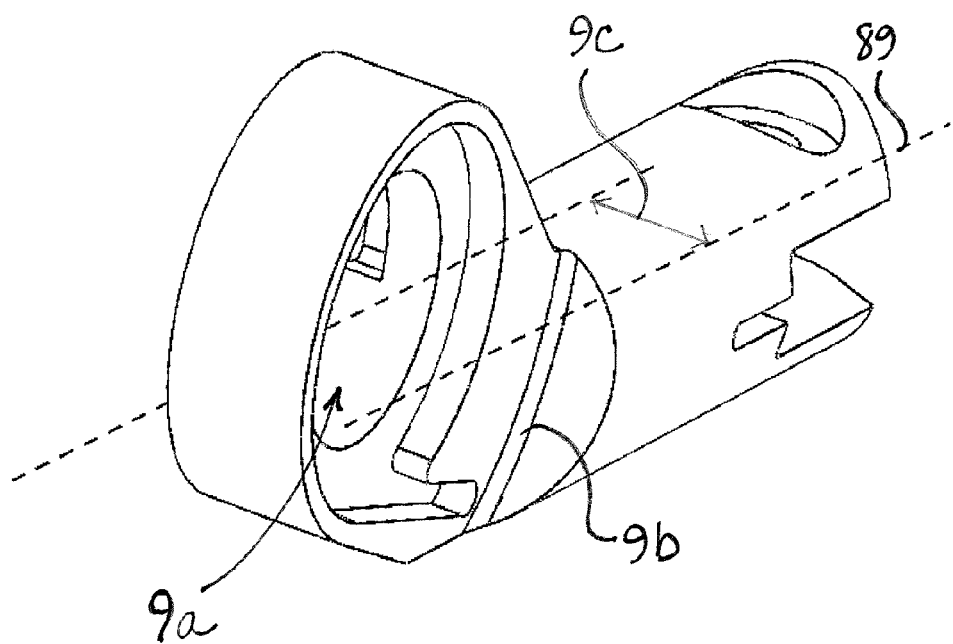
FIG. 24 depicts an isolated view of a portion of a payload joint.

FIG. 24 shows offsets that facilitate a compact folding structure. FIG. 24 is an isolated view of a component 88 of horizontal payload swivel 20, which is a portion of payload joint 9 that is non-rotatable with respect to upright 19. A lateral offset 9b is shown, which is the offset extending from the outside face surrounding aperture 9a. A vertical offset 9c is the offset between the extended longitudinal centerline 89 of payload swivel component 20 and the radial center of aperture 9a. Primary joint 7 and mid joint 8 may also contain offsets in order to compactly align spars 10, 11, mounting pin 35, and payload joint 9 for folding within a minimal cross-sectional area.

Additional offsets of mounting pin 35, turnbuckle assembly 24, and clamp assembly 6, provide a compact folded arrangement. Folding payload grabbers 21a,b tuck in just alongside proximal and distal spars 10, 11, and mounting clamp assembly 6 slides just over the opposite pair of joints until main mounting clamp shaft 26 touches or nearly touches turnbuckle assembly 24. In an illustrative embodiment of the invention, the tensile parallelogram arm assembly 1 folds to an approximately 2"×2"×14", roughly cylindrical envelope that, may weigh for example, in the range of about 10 oz-14 oz, or in a particular embodiment about 12 oz. A fabric or rigid tube can be provided to house the folded apparatus.

Figure 4:
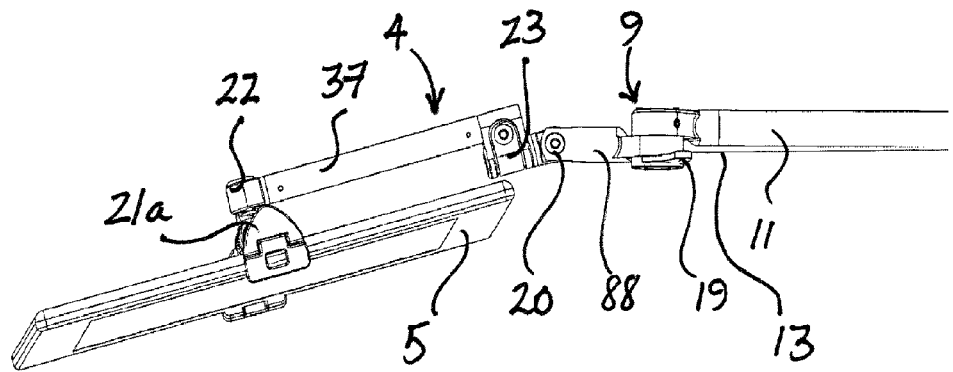
FIG. 4 is a top view of a gimbal assembly and a payload.
Figure 5:
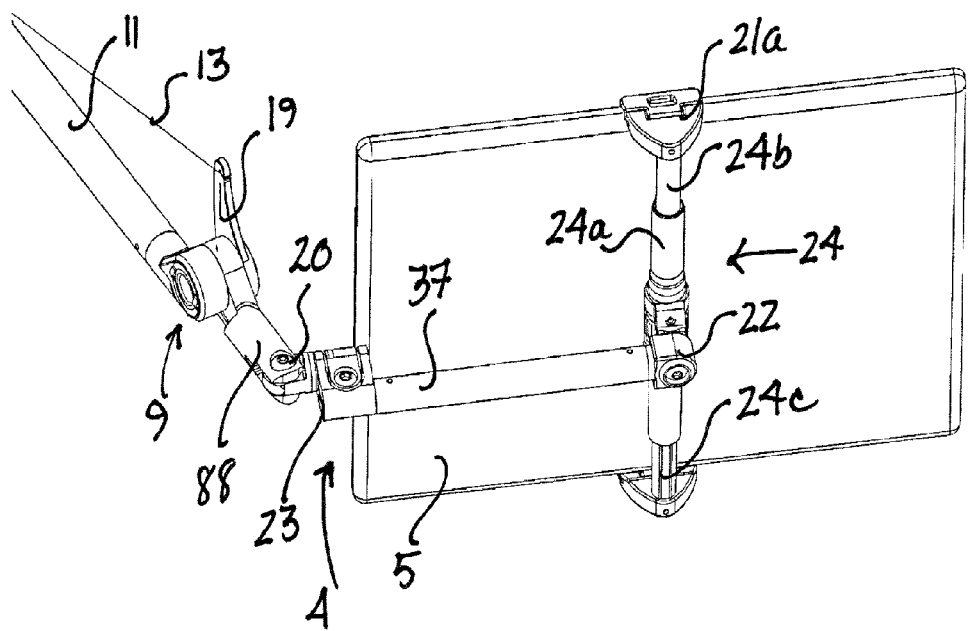
FIG. 5 is a back view of a gimbal assembly and a payload showing a swivel connection.

FIG. 4 is a top view of gimbal assembly 4 showing payload main swivel 20, which can swing entire gimbal assembly 4 about 90° to either side of the long axis of parallelogram arm 1, for example. Swivels or pivots 20, 22, 23 have rotational axes in orthogonal relation to one another. Swivel 20 pivotally connects payload joint 9, and thus distal spar 11, perpendicularly to swivel 23. Swivel 23 is further connected to gimbal rod 37. Gimbal rod 37 is pivotally connected to turnbuckle assembly 24, as shown in FIG. 5 by swivel 22. When the face of payload 5 is disposed vertically, swivel 20 represents pan motion, swivel 22 represents roll motion, and swivel 23 represents tilt motion. Therefore, payload 5 can be positioned at substantially any angle of tilt or roll, with its net center of gravity approximately in line with the axis of tilt swivel 23, so that gimbal joints require little or no friction to maintain their position. This allows payload 5, which is clamped within payload grabbers 21a,b, to be re-oriented with no locking or unlocking of fixed joints, although locks can be optionally incorporated into the assembly to maintain a particular payload position.

Payload gimbal assembly 4 can include payload holders other than the turnbuckle assembly 24 shown in FIG. 5. A payload holder can be any component that adequately secures the payload to the apparatus, allows for adjustability as needed or desired and does not interfere with the operation of the assembly.

Figure 6:
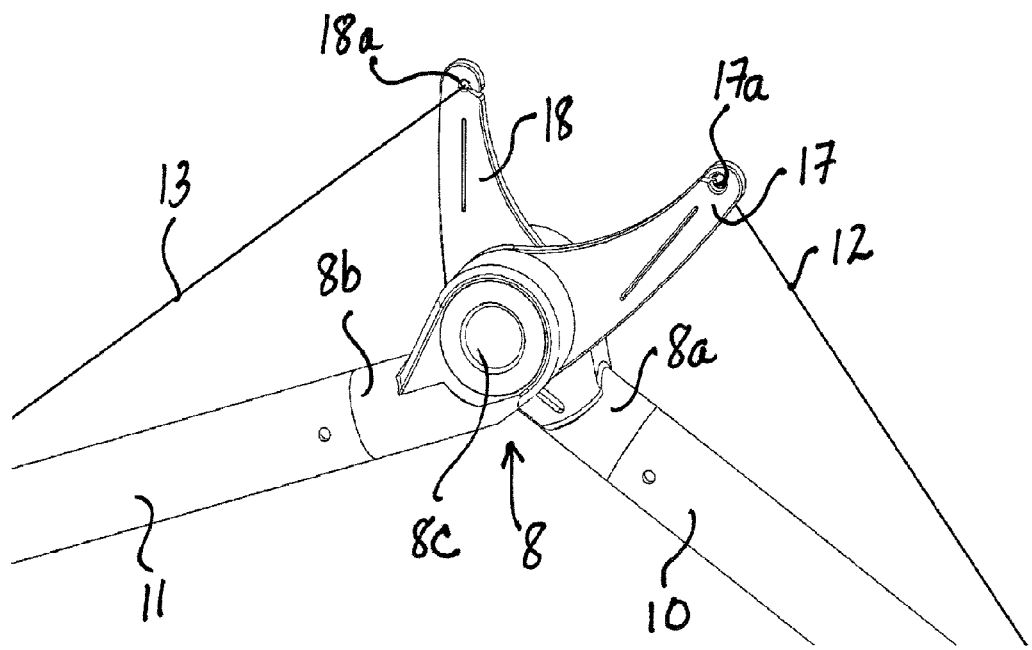
FIG. 6 is a close up view of a mid joint and first and second mid uprights.
Figure 25:
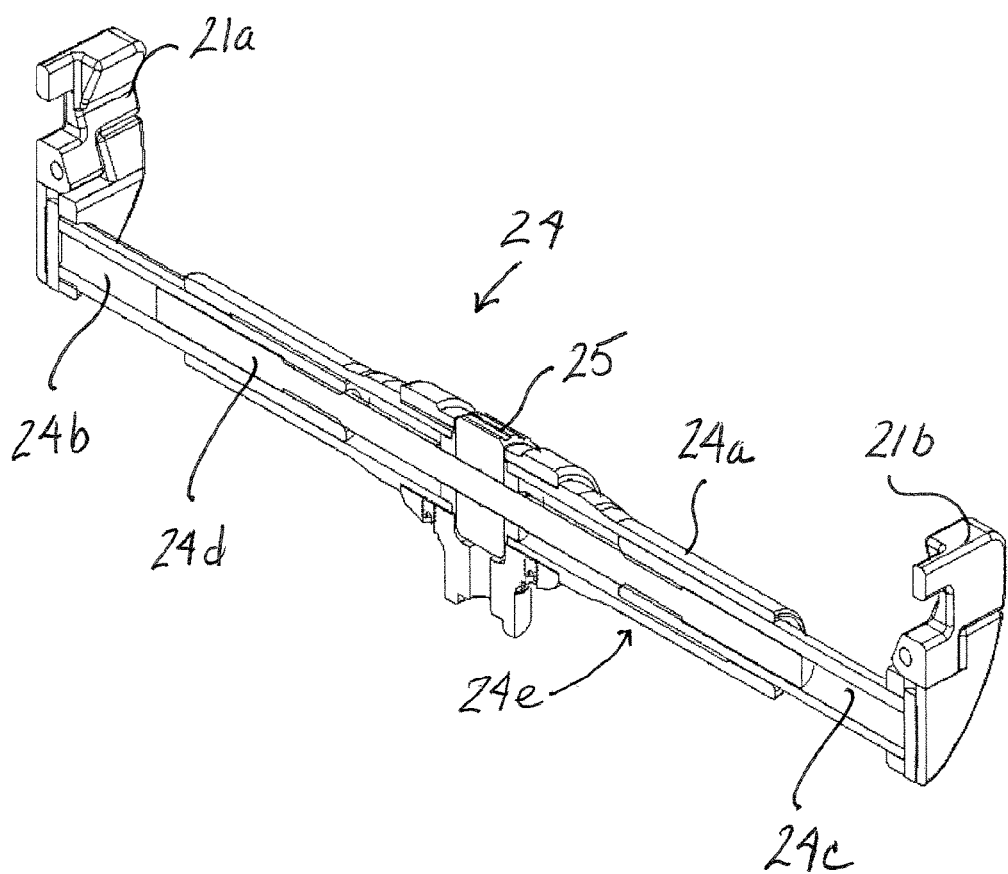
FIG. 25 is a cross-sectional view of turnbuckle assembly.

FIGS. 5 and 25 depict gimbal assembly 4 and the associated turnbuckle assembly 24. FIG. 5 is a back perspective view of gimbal assembly 4 and payload 5 detailing swivel connection 20 swung nearly 90° to the side. FIG. 25 is a cutaway view of turnbuckle assembly 24. Payload 5 is clamped within grabbers 21a,b, which are attached to extenders 24b,c of turnbuckle assembly 24. Extenders 24b,c are drawn into barrel 24a, for example by a threaded driver 24d, using turnbuckle adjustment knob 25. Turnbuckle outer barrel 24a may have a flat side that registers with a complementary side on extenders 24b,c to prohibit relative rotation between outer barrel 24a and extenders 24a,b,c. The flat sides are identified roughly by 24e. Note that payload 5 can roll about the axis of swivel 22, and tilt around the axis of swivel 23, while positioned appropriately with respect to the arm axis by main swivel 20. When parallelogram arm 1 is unfolded, the angular relationship between payload upright 19 and an eye in payload joint 9 (equivalent to mid joint eyes 8a,b in spars 10, 11, respectively, as shown in FIG. 6) is limited by a tab and slot arrangement, or other mechanism, so that the axis of swivel 20 remains substantially vertical. The tab and slot mechanism is described further with respect to FIGS. 12a,b.

FIG. 6 is a close view of mid joint 8 and first and second mid uprights 17, 18. Proximal line 12 extends from first mid upright 17, and is captured by origin knot 17a. For lines already knotted, a slot instead of a hole can be provided. An illustrative slot is primary tension line origin slot 38 through which tension line 12 passes. The termination of proximal and distal lines 12, 13 may be made, which may include increasing the diameter of the end of tension line 12 by other than knots. Likewise, distal line 13 extends from second mid upright 18, captured by origin knot 18a disposed in a slot. Holes and slots may be interchanged, the choice of which may depend on threading and repair considerations. Mid joint 8 comprises joint eye 8a attached to spar 10, and joint eye 8b attached to spar 11 and mid joint cable aperture 8c. A feature of this embodiment is that cables, such as those for powering or charging payloads and their accessories, can be bent double, or otherwise on itself, and inserted into similar apertures in each arm joint and will remain protected and unaffected, or minimally affected to angular adjustments of the arm position, which can be inserted and instantly removed without threading connectors through holes.

Figure 7:
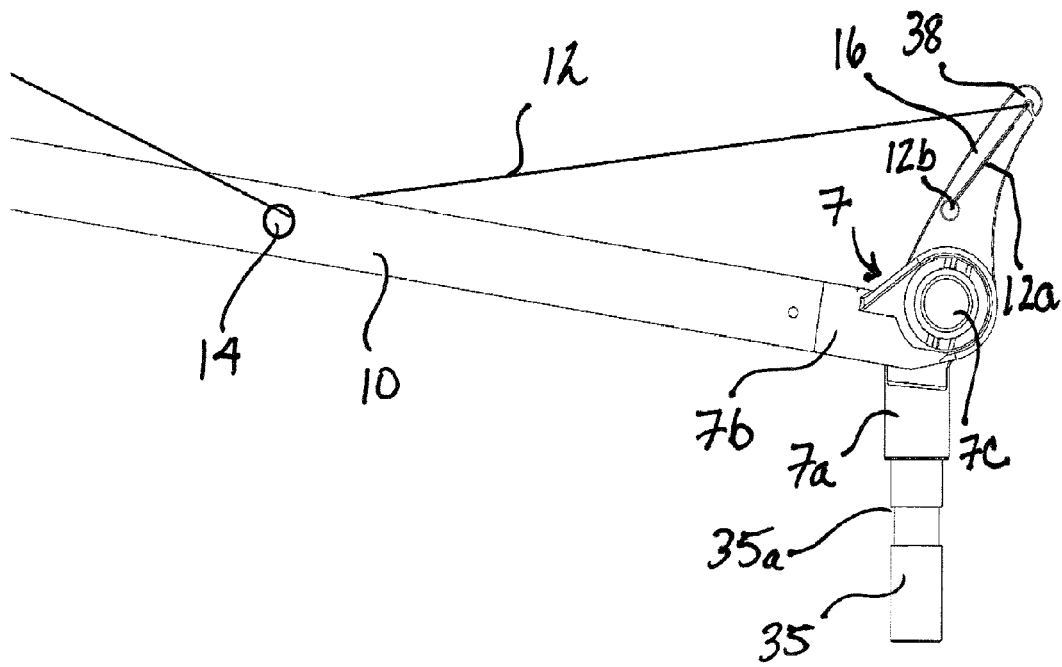
Figure 12A:
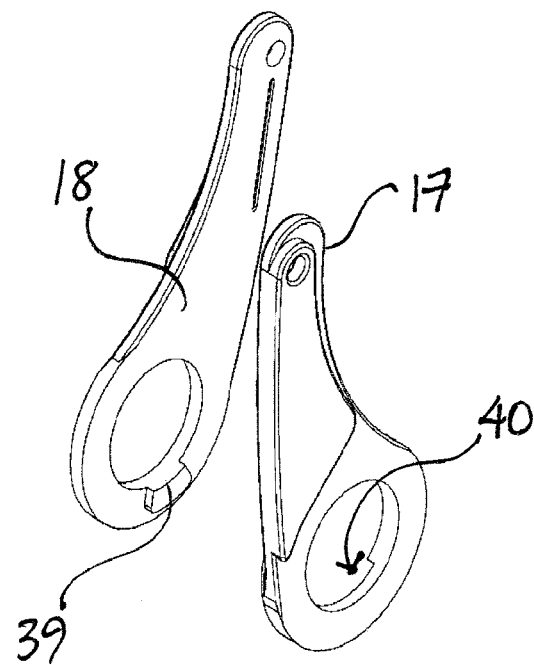
FIGS. 12a,b show isometric views from both sides of mid joint uprights depicting tab and slot features.
Figure 12B:
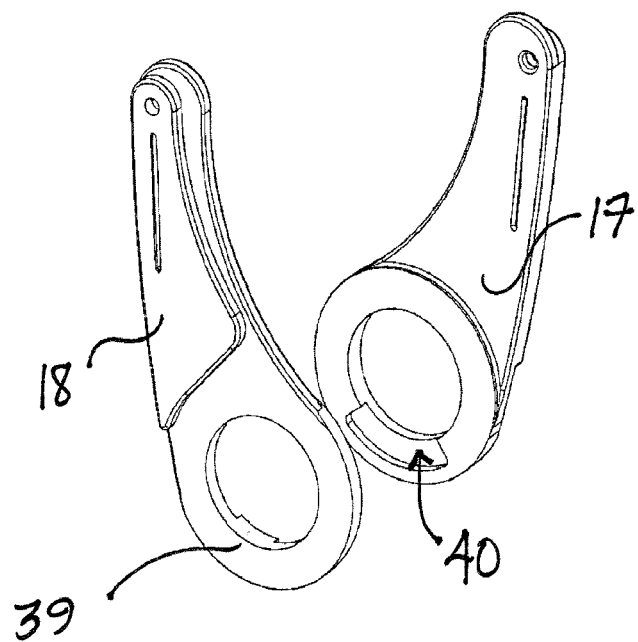

FIG. 7 is a close view of primary joint 7, showing primary upright 16 and proximal spar 10 with line pass-through and termination details. Primary joint 7 includes cable aperture 7c and primary joint eyes 7a, 7b, connected respectively to proximal spar 10 and primary mounting pin 35. The spars may be functionally connected to the joints by other than the eye configuration depicted in FIGS. 6 and 7. Spar joint connection components must functionally secure the spar to the joint and allow the connected spar to rotate with respect to the upright. An undercut 35a in primary mounting pin 35 engages locking cap 32 (shown in FIG. 9) to keep primary mounting pin 35 engaged within clamp assembly 6 (see FIG. 8). Primary upright 16 is held by a tab and slot combination, or other connection (such as shown in FIGS. 12a, b), in limited rotational association with primary joint eye 7a and primary mounting pin 35. Primary upright 16, therefore, serves as a primary attachment to proximal tension line 12 which supports the entirety of parallelogram arm assembly 1. Alternate line origin and length adjustment configurations include extending tension line 12 to proximal line termination screw 12b. Indication line 12a shows the hidden path of proximal tension line 12. Proximal tension line 12 passes through a channel adjacent to a threaded hole and is captured by proximal line termination screw 12b. Additional lines can be provided with origin knot 17a and a marking or other feature indicating or limiting how far the line should be pulled through hole at 12b in order to ensure parallelism between the primary upright 16 and first mid upright 17 that flank proximal spar 10. Proximal line 12 is shown here entering proximal spar pass-through 14. When proximal tension line 12 is tensioned, the resulting two right-angle bends at pass-through 14 may provide the necessary friction to lock arm position, and will release the arm position and let line freely 'pass through' when line is slackened for adjustment. As will be described below, other mechanisms to create the necessary friction or resistance can be used to achieve the aforementioned effect.

Figure 8:
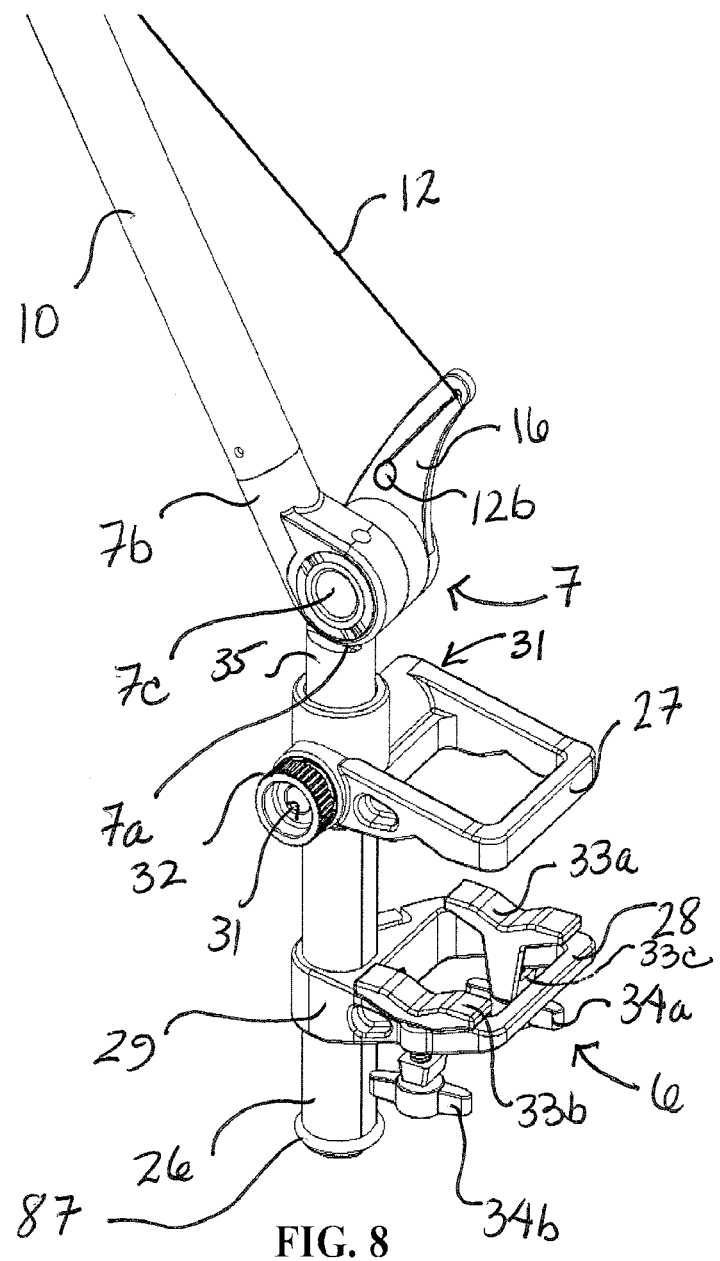
FIG. 8 is a partial side view of primary joint and proximal spar docked in a three-axis mounting clamp assembly.
Figure 9:
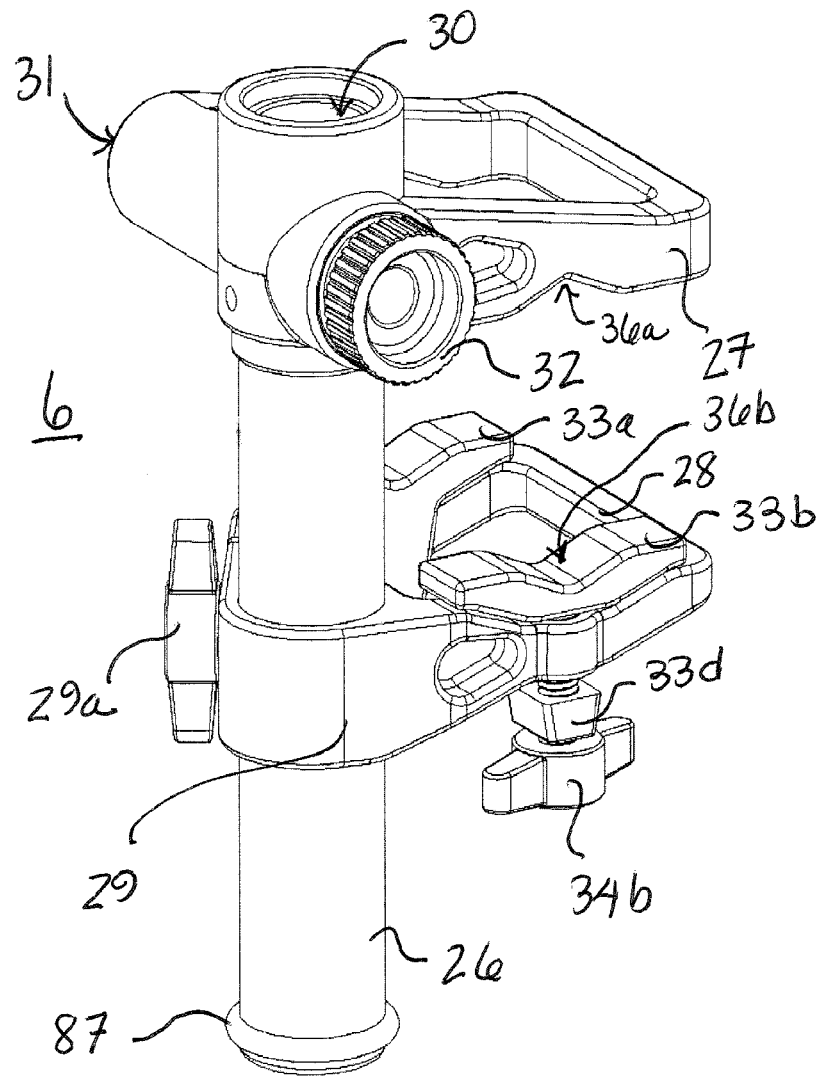
FIG. 9 is an isometric view of a three-way mounting clamp assembly.

FIGS. 8 and 9 depict clamp assembly 6. FIG. 8 is a partial side view of primary joint 7 and proximal spar 10 docked in three-axis mounting clamp assembly 6. FIG. 9 is a detailed isometric view of three-way mounting clamp assembly 6. Main mounting hole 30 and cross mounting hole 31 are configured to accept the primary mounting pin 35 shown in FIG. 7. Locking cap 32 has a threaded shank that engages threads within cross mounting hole 31 and an end braking surface that engages pin undercut 35a (also visible in FIG. 7) to prevent primary mounting pin 35 from being pulled out of main mounting hole 30. When primary mounting pin 35 is installed in cross mounting hole 31, at the location shown occupied by cap 32 in FIG. 9, then locking cap 32 is threaded into main mounting hole 30 to likewise prevent primary mounting pin 35 from disengaging in the event of an upward pull. Fixed frame 27 forms the top clamp surface (or side surface in the event of mounting to a vertical surface). Sliding frame 28 may be registered by an outside flat surface on main clamp shaft 26 and can be slid upwards until clamp pads 33a,b engage the underside of the surface to which the apparatus is to be clamped. Split clamp 29 is then tightened around main clamp shaft 26 and clamp pads 33a,b (retained by clamp pad keepers 33c,d) are tightened up against the surface by clamp pad screws 34a, b. Clamp pads 34a,b may be entirely rigid or include a cushioning material on top. This novel clamp design permits force to be applied to the structure onto which the assembly is clamped, from the 'top', 'bottom' and 'side'. The terms "top," "bottom" and "side" are used as relative terms only and do not limit the assembly from being clamped to a structure orientated so that there is no clear top, bottom or side. The clamping apparatus may be designed to accommodate structures of various sizes. An illustrative range of object thickness to which the apparatus can clamp is about 0.25 to 4 inches, with an illustrative thickness of approximately 3 inches.

An O-ring 87 or other stop may be included to prevent split clamp 29 from separating from the assembly. A groove in clamp shaft 26 may be included to accommodate and position O-ring 87. It is noted that clamp 29 need not be a split clamp. Other components that would be adjustable and securable along main clamp shaft 26 could be substituted for the split clamp configuration.

Figure 10:
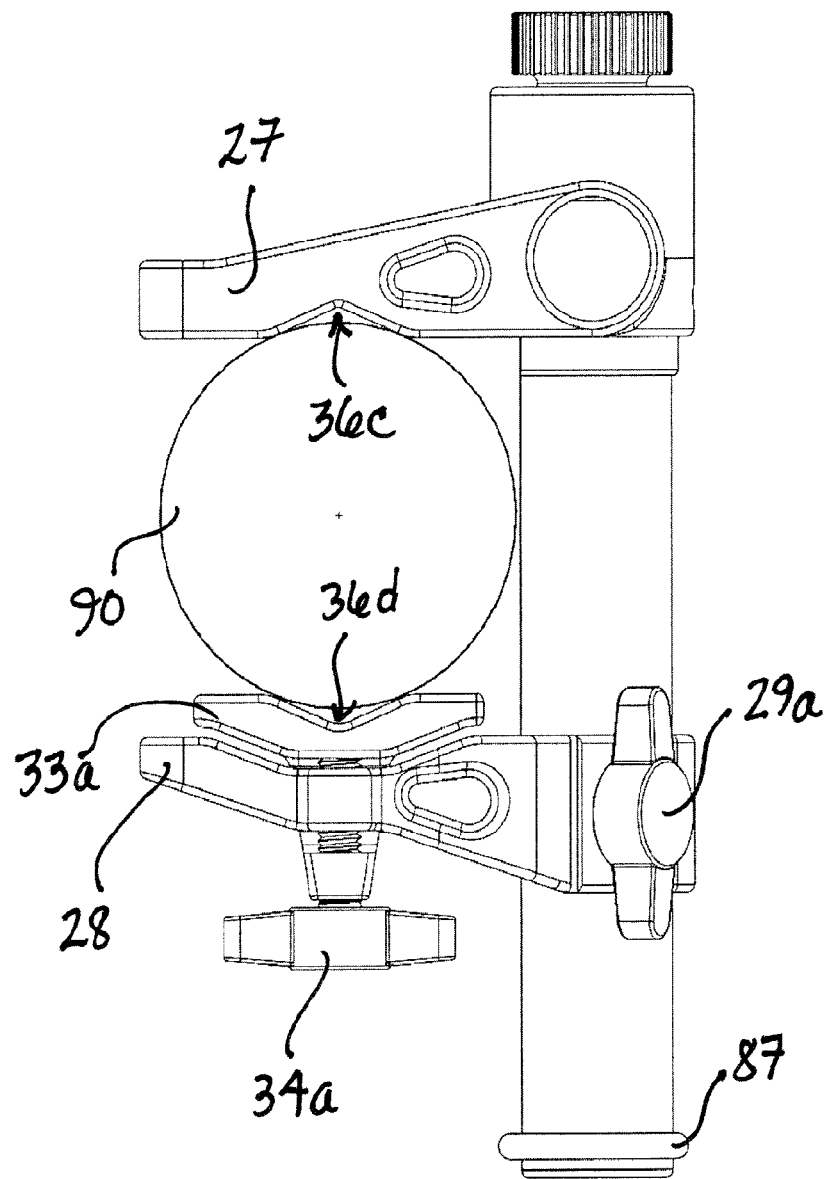
FIG. 10 is a side view of a version of a three-way mounting clamp assembly shown engaging a pipe.

FIG. 10 is a side view of an illustrative version of a three-way mounting clamp assembly 6 shown engaging a pipe 36. Tube mounting notches 36a,b and 36c,d, shown in FIGS. 9 and 10, respectively, help to position pipe 36 in a desirable location. Flat portions on either side of the notches facilitate clamping onto flat surfaces.

FIGS. 12a,b show isometric views from both sides of mid joint uprights 17, 18 detailing tab 39 and slot 40 features, which provide bi-directional rotation limits. The limits maintain the maximum angular relationship between uprights 17, 18 of serially adjacent parallelogram arm segments and can be designed to permit folding. The upright on which each of the tab and slot is located can be interchanged. Other similar configurations can be used provided they allow the desired rotational limits. These configurations can be used at other joints.

Figure 13:
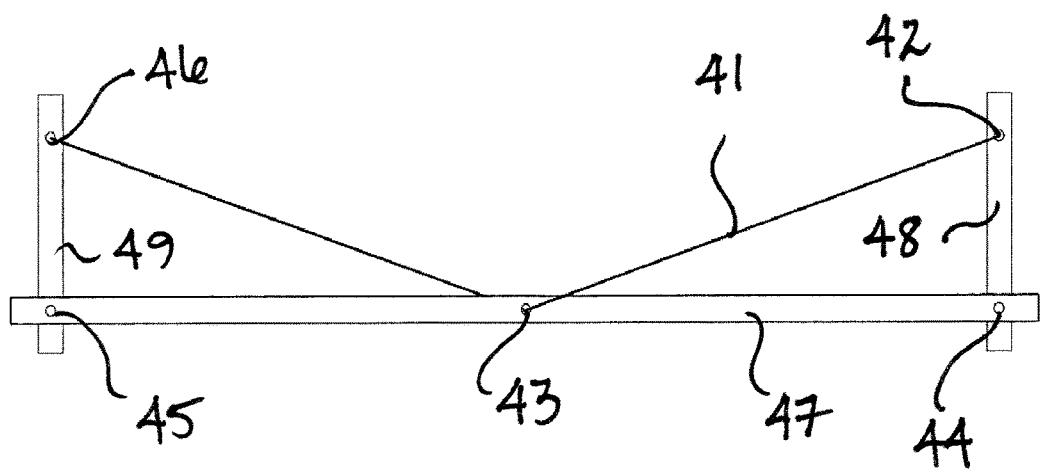
FIG. 13 depicts a graphical representation of a parallelogram arm.

FIG. 13 is a schematic of a parallelogram structure. Illustrative dimensions and tension line lengths are provided below if a tension line 41 extends conventionally from an upper parallelogram pivot 42 through a mid pass-through 43 in line with lower parallelogram pivots 44, 45 and back up to an opposite upper parallelogram pivot 46. The function of tension line 41 is to create a bridge-like structure—which is dynamic rather than fixed—with a single line running from a high point at pivot 42 on a first upright 48, through pass-through 43 at the center of a moveable spar 47 and back up to a high point at pivot 46 on a second upright 48, wherein first upright 48 is fixed and second upright 49 and spar 47 are moveable. This single tension line 41 will both fix the elevation of spar 47 and the parallelism of second upright 49. However, if the attachment points of tension line 41 on first and second uprights 48, 49 when vertical are also vertically in line with the pivots, and the hole in the center of the spar 47 is in line with lower pivots 44, 45, the length of string required to keep uprights 48, 49 parallel changes as spar 47 is raised or lowered (see FIGS. 14a,b). With spar 47 horizontal, segments of tension line 41 on either side of mid pass-through 43 are equal.

| END POINTS OF LINE PORTION | LENGTH (inches) |
|---|---|
| 43-45 | 6 |
| 43-44 | 6 |
| 45-46 | 2 |
| 44-42 | 2 |
| 42-43 | 6.235 |
| 46-43 | 6.235 |

Figure 14A:
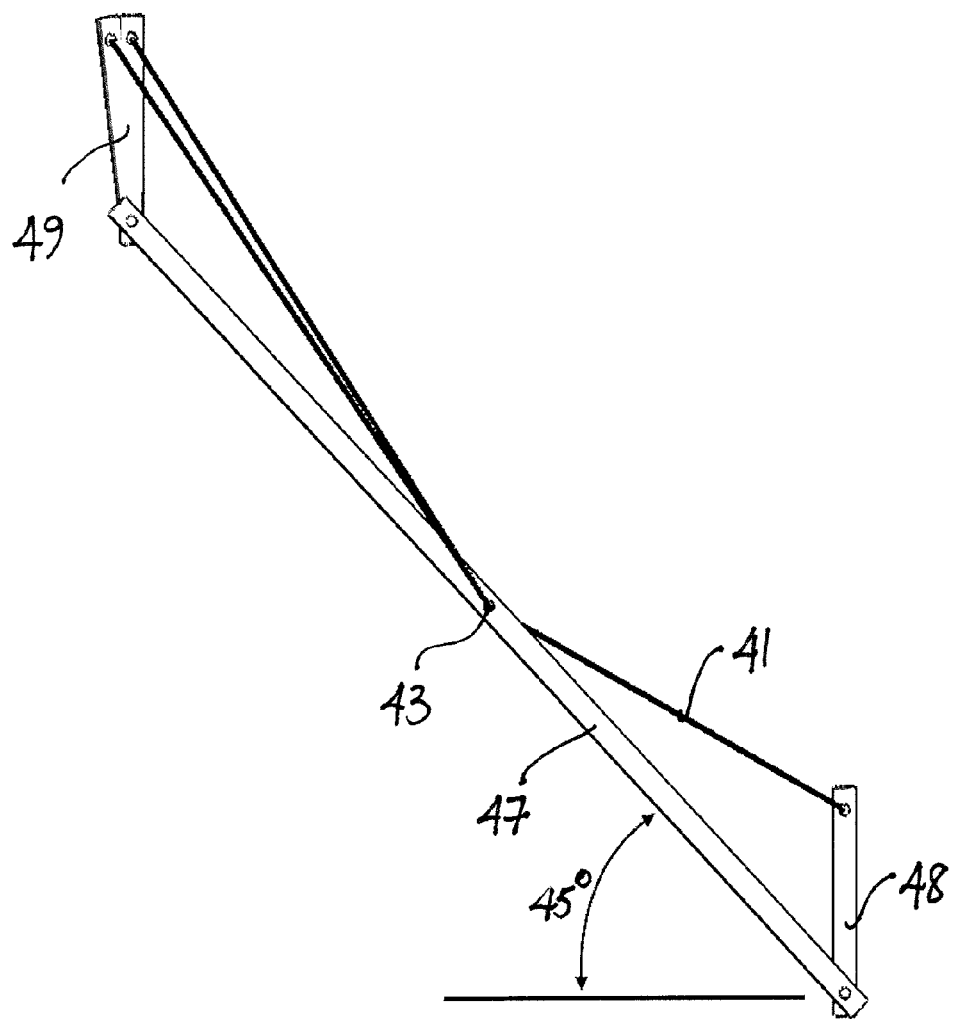
FIGS. 14a,b diagram line length changes when a parallelogram is respectively angled up at 45° and 60°.

FIGS. 14a,b diagram line length changes when the parallelogram structure of FIG. 13 is angled up from a horizontal position by 45° and 60°, respectively. As spar 47 is raised, the ideal string length diminishes. At 45°, as shown in FIG. 14a, to keep the first and second uprights 48, 49 parallel, tension line 41 must be 12.347 inches in length in this example, with a length of 4.799 inches between the tension termination point on first upright 48 and mid pass-through 43, and 7.548 inches between the tension termination point on second upright 49 and pass-through 43. At a total tension line length of 12.470, first and second uprights 48, 49 are not parallel. At 60° from the horizontal, as shown in FIG. 14b, to keep the first and second uprights 48, 49 parallel, tension line 41 must be 12.180 inches in length in this example, with a length of 4.384 inches between the tension termination point on first upright 48 and mid pass-through 43, and 7.796 inches between the tension termination point on second upright 49 and pass-through 43. At a total tension line length of 12.470 the line will be slack and first and second uprights 48, 49 are will not be parallel.

FIG. 15 diagrams horizontal offsets 50, 51 of tension line 41 attachment points as measured perpendicularly from first and second uprights 48, 49, respectively. A vertical offset 52 of tension line 41 from mid pass through 43 perpendicular from moveable spar 47 is also shown. Appropriate offset values, can prevent or substantially inhibit any change of length of tension line 41 throughout upward or downward excursions of moveable spar 47, and hence the parallelogram structure.

Figure 16:
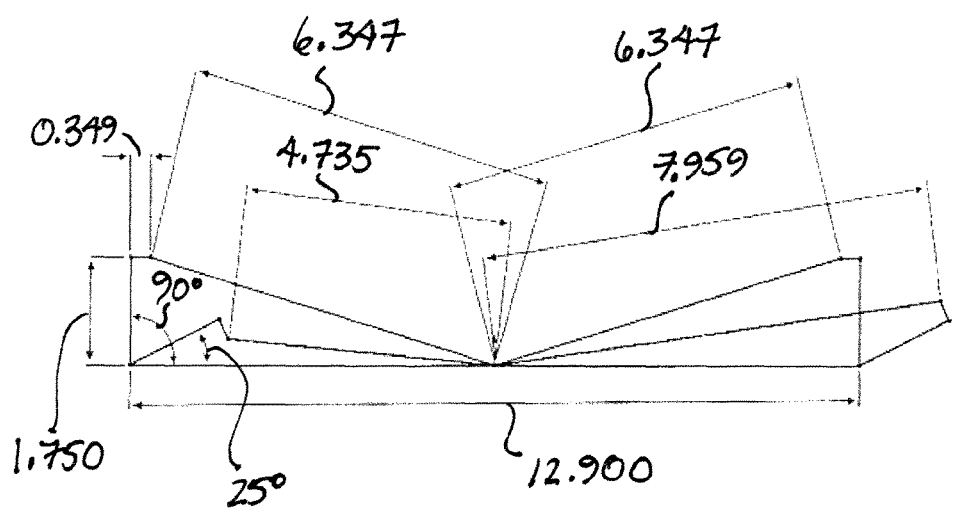
FIG. 16 diagrams selected values for horizontal and vertical offsets for substantially consistent line length.

FIG. 16 diagrams selected values for horizontal and vertical offsets that yield consistent or substantially consistent line length throughout upward and downward angular excursions of parallelogram in illustrative embodiments of the invention.

Figure 17:
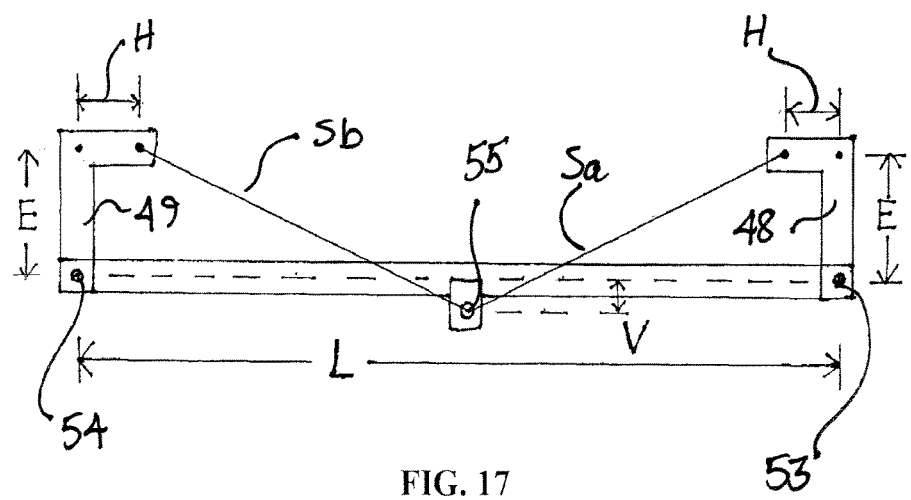
FIG. 17 provides a formula for calculating horizontal offset distances for a parallelogram with given dimensions.

FIG. 17 identifies variables for a formula for calculating horizontal offset distances 50, 51 (shown by "H") for a parallelogram with given dimensions between opposing pivots 53, 54, and a vertical offset distance 52 (shown by "V") between an offset pass-through 55 and the line between pivots 53, 54 to prevent or substantially inhibit any change of length of tension line 41 throughout upward or downward excursions of moveable spar 47. This maintains substantial parallelism throughout an excursion path of the arm segment. The formula is as follows:

| | |
|---|---|
| H = Horizontal offset | Choose arm length L, and arm height E |
| V = Vertical offset | Choose V |
| E = Height of parallelogram | Calculate the initial string angle, |
| L = Length of parallelogram | arms at 90°, as shown |
| S = String length | S_ang = arctan(2 × (E + V)/L) |
| S = Sa + Sb | Calculate H offset: |
| | H = E × sin(S_ang) |
| | Calculate final string length |
| | (use Pythagorean theorem) |
| | S = 2 × square root |
| | ((E + V)^2 + (L/2 − H)^2) | note:
^ means to square the value

The offsets diagrammed in FIG. 17 and described in this paragraph, may take the place of angling uprights at opposing ends of a spar inward toward one another to achieve the desired counterbalancing or equipoising function, typically provided by traditional parallelogram arm structures. If angling is used, it will typically be a slightly less than 90° angle between the spar and the upright, with an illustrative angle from the perpendicular being less than 5° or 5°. A combination of angling and offsets can also be used.

Figure 18A:
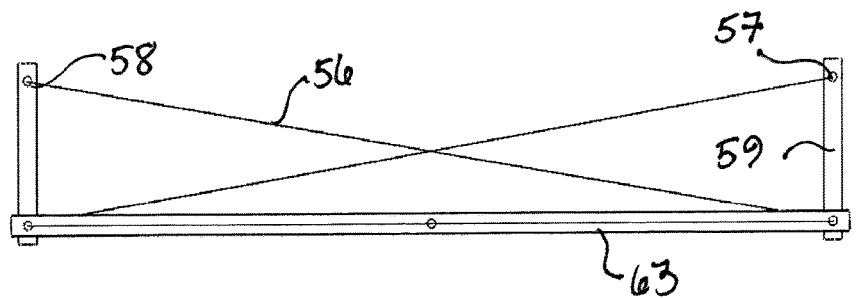
FIGS. 18a,b diagram selected line paths for alternative embodiments of the invention.

FIGS. 18a,b diagram alternative line paths according to illustrative embodiments of the invention that may also provide relief of tensile friction from various pass-through points by electively reducing either the torque or the tensile force acting on the next upright in line toward the payload. This permits the tension line to readily traverse the pass through as the parallelogram lifts or lowers. When the pass-through friction is re-established, the parallelogram is effectively locked at its momentary attitude. FIG. 18a depicts a tension line 56 with termination points 57, 58 on uprights 59, 60, respectively. Appropriate horizontal offsets would be needed to keep uprights 59, 60 parallel during upward and downward excursions of moveable spar 63.

Figure 18B:
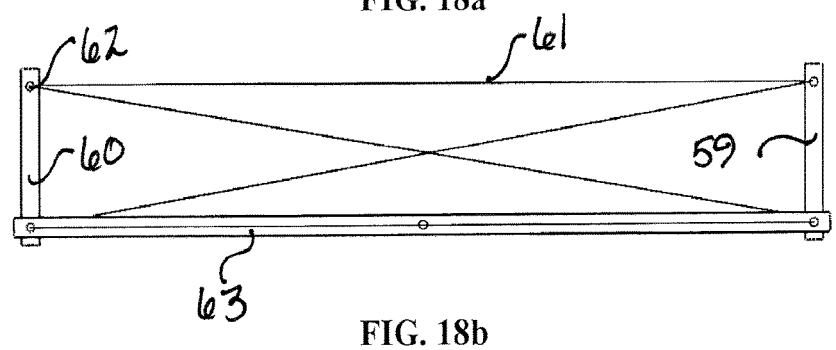

FIG. 18b depicts tension line 61 with a single termination point 62 for both ends of the tension line. By having tension line 61 extend through the upper eye on upright 59 and over to the top of upright 60 to terminate where it started, the small line length discrepancy is absorbed to the extent that the uprights will appear nearly parallel at any upward or downward excursion.

Figure 19:
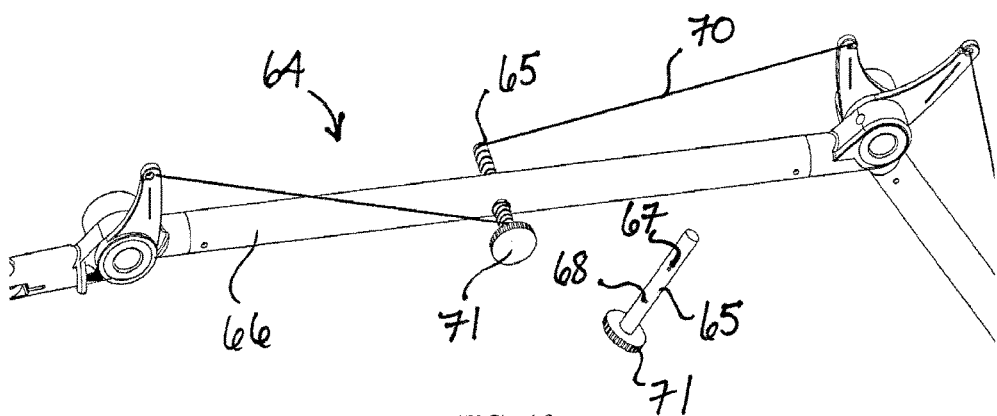
FIG. 19 diagrams a motorized parallelogram arm.

FIG. 19 diagrams a motorized parallelogram arm segment 64 employing a windlass arrangement to raise and lower the arm by identically winding in and releasing quantities of line on either side of a mid pass-through. Post 65 extends through spar 66 so that holes 67, 68 on post 65 straddle spar 66. FIG. 19 includes an inset of post 65. Tension line 70 is threaded through the holes in post 65 so that as lengths of line are added on one side of the post by rotation of post 65, the line is taken up on the other side. This varies the relative amount of line on either side of the 'pass-through.' A knob 71 may be included that can be used to manually rotate pot 65.

Figure 20:
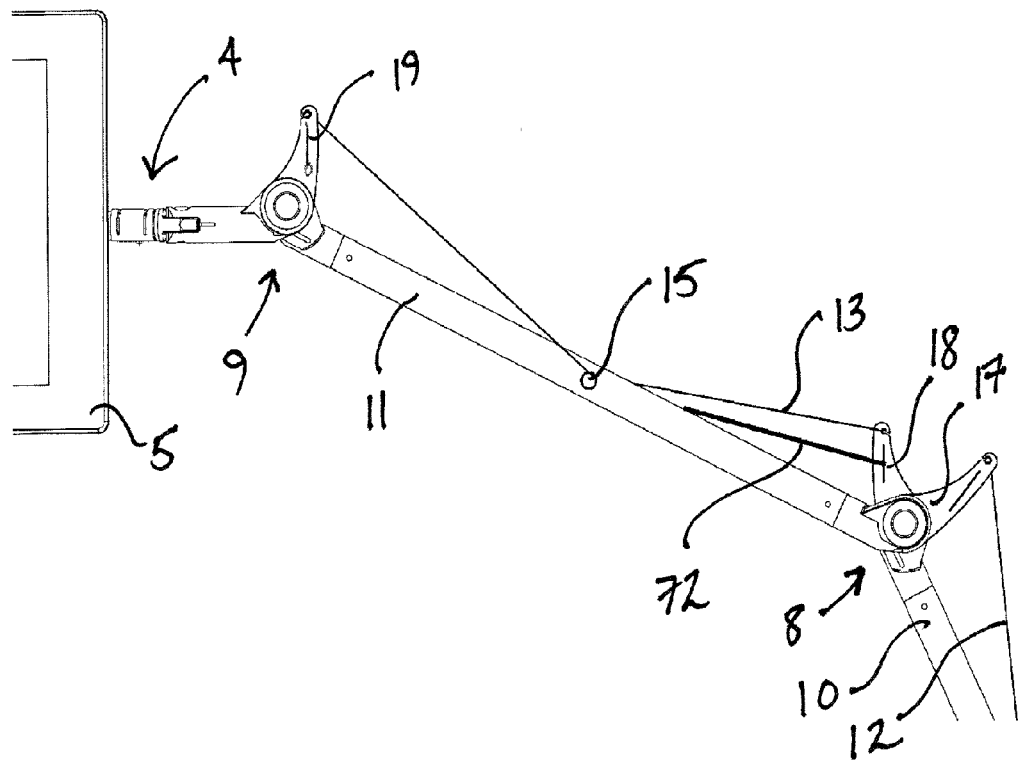
FIG. 20 depicts a tensile parallelogram arm segment with a supplementary resilient component to further counteract the payload weight.

FIG. 20 depicts an illustrative embodiment of the invention with a supplementary resilient component 72 to counteract the weight of payload 5. The resilient component 72, when added to the parallelogram structure can reduce the tension line friction needed to hold the position of moveable spar 11, and hence the tensile parallelogram arm.

Figure 21:
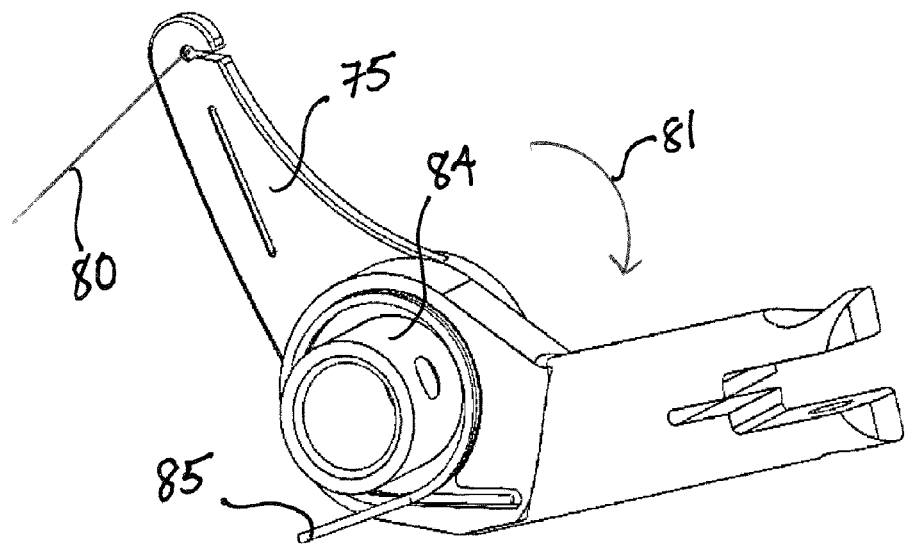
FIG. 21 depicts an arm joint with a line-tension, augmenting, torsion spring.
Figure 22:
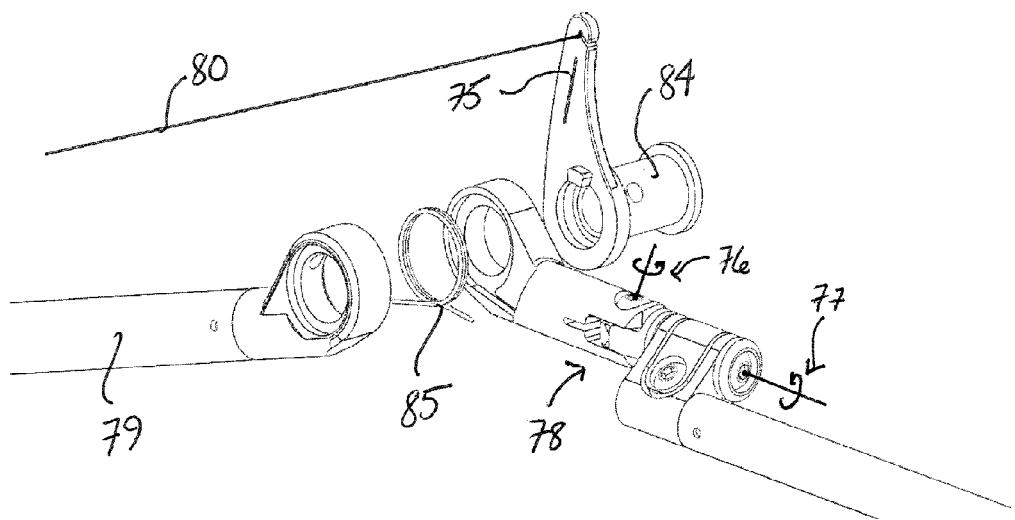
FIG. 22 is an exploded view of an arm joint with a torsion spring.

FIGS. 21, 22 depict a torsion spring assembly that can be implemented to augment the torque required to maintain the parallelogram arm in a desired position. FIG. 21 shows a partial cutaway view of the assembled torsion spring apparatus and FIG. 22 is an exploded view of the torsion spring assembly. An axle 84 is disposed through, and connects, an upright 75, a swivel assembly 78, which in this embodiment provides two perpendicular rotational axes 76, 77, a torsion spring 85 and a fixed element or joint 79, such as a spar. A tension line 80 is connected at or toward the top of upright 75. A torsion spring such as this could augment the torque provided by the load at payload joint 9, or other joints in the tensile parallelogram arm. Torque from spring 85 is represented by arrow 81. The torsion spring acts to increase axial torque around the joint so that the arm can be readily adapted to hold position, including possibly in a zero-g environment such as a space station. The uprights and associated tension lines can be multiplied at 120° displacements around the longitudinal axis of spar 10 or 11, for example, so the arm is braced from three angles instead of just one in order to augment sideways as well as vertical rigidity.

Figure 23:
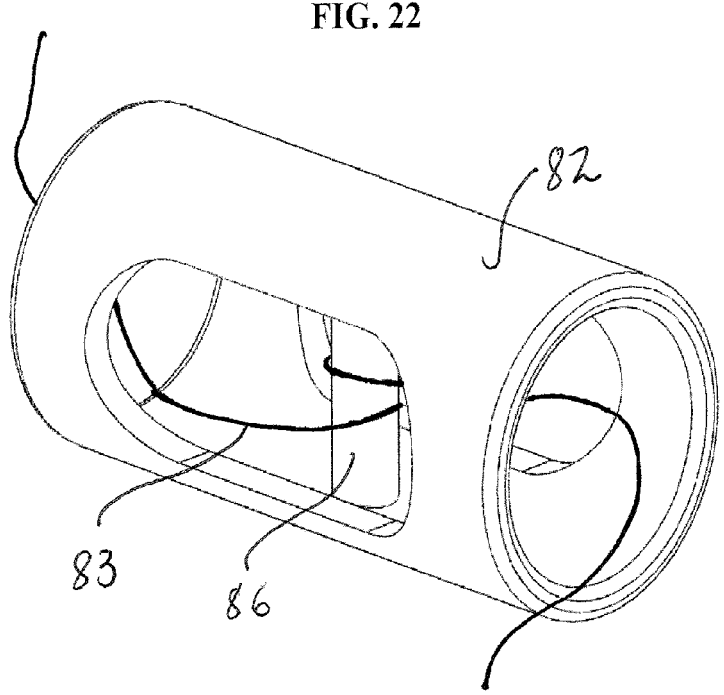
FIG. 23 depicts a spar cross tube with an associated capstan pin, through and about which a tension line is threaded.

FIG. 23 depicts another method of creating friction or resistance to the passage of tension lines 12, 13 through pass-throughs 14, 15. A cross tube 82 is disposed through a spar such as spars 10, 11, perpendicular to the longitudinal axis of the spar. Instead of a tension line 83 passing directly through cross tube 82, it wraps around pin 86, thus creating more friction than if tension line 83 passed straight through the tube. The ends of cross tube 82 are preferably radiused or rounded so as to reduce wear on tension line 83.

Various embodiments of the invention have been described, each having a different combination of elements. The invention is not limited to the specific embodiments disclosed, and may include different combinations of the elements disclosed or omission of some elements and the equivalents of such structures.

While the invention has been described by illustrative embodiments, additional advantages and modifications will occur to those skilled in the art. Therefore, the invention in its broader aspects is not limited to specific details shown and described herein. Modifications, for example, to dimensions, and incorporation of equivalent components, may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A payload support assembly comprising:
a proximal end and a distal end, the proximal end having a mounting component and the distal end having a payload holder;
a counterbalancing arm having:
a first arm segment having a proximal end and an opposing distal end;
a second arm segment having a proximal end and an opposing distal end;
the first arm segment connected at its distal end to the second arm segment at the second arm segment proximal end by a mid joint assembly;
the first arm segment having a spar, the first arm segment spar having a proximal end and an opposing distal end;
the first arm segment spar rotationally connected about an axis perpendicular to the first arm segment spar to a primary upright at its proximal end and to a first mid upright at its distal end via the mid joint assembly;
the second arm segment having a spar, the second arm segment spar having a proximal end and an opposing distal end;
the second arm segment spar rotationally connected about an axis perpendicular to the second arm segment spar to a second mid upright at its proximate end and to a payload upright at its distal end via the mid joint assembly;
the first arm segment connected to a primary joint assembly at the first arm segment proximal end;
the second arm segment connected to a payload joint assembly at the second arm segment distal end;
the first arm segment having a first friction component;
the second arm segment having a second friction component;
a first tension line connected to the primary upright and further connected to the first mid upright and acted on by the first friction component;
a second tension line connected to the second mid upright and further connected to the payload upright and acted on by the second friction component;
the first mid upright and the second mid upright having a fixed maximum angular relationship to one another provided by a limit stop, but otherwise foldable toward one another;
the first mid upright in fixed maximum angular relationship to the second spar, but foldable with respect thereto;
the second mid upright in fixed maximum angular relationship to the first spar, but foldable with respect thereto;
the mounting component attached to the primary joint assembly, the mounting component in fixed maximum angular relationship to the primary upright but foldable with respect thereto;
the payload holder attached to the payload joint assembly, the payload holder in fixed maximum angular relationship to the payload upright but foldable with respect thereto; and
wherein the mounting component is approximately perpendicular to a distal component extending from the payload joint assembly;
wherein the payload support assembly counterbalances a payload; and
wherein approximate parallelism of the primary upright with respect to the first mid upright, and of the second mid upright with respect to the payload upright is maintained throughout an excursion of the first arm segment and the second arm segment.

2. The payload support assembly of claim 1 wherein the payload joint assembly has a torsion spring functionally disposed therein to increase axial torque.

3. The payload support assembly of claim 1 wherein:
one of either the first or second mid upright has a slot and the other of the first or second mid upright has a tab extended into the slot and that is complementary to the slot; and
wherein upon relative rotation of the first and second mid uprights the tab and slot engage to provide a bi-directional limit on the degree of rotation.

4. The payload support assembly of claim 1 wherein:
the friction component in at least one of the first or second arm segment is a pass-through in the form of a hole disposed through the spar through which the respective first or second tension line is threaded.

5. The payload support assembly of claim 4 further comprising a tube disposed in the spar to form the hole, wherein the tube is disposed perpendicularly to the longitudinal axis of the spar.

6. The payload support assembly of claim 5 further comprising:
a pin fixedly extending from an inner surface of the tube around which the tension line is wrapped.

7. The payload support assembly of claim 1 further comprising a mounting assembly configured to be connected to the mounting component, wherein when connected the payload support assembly is rotatable with respect to the mounting assembly about a substantially vertical axis.

8. The payload support assembly of claim 7 wherein:
the mounting component is a mounting pin extending from the counterbalancing arm at its proximal end; and
the mounting assembly includes:
a main shaft;
the main shaft is configured to accept the mounting pin longitudinally into the shaft;
the main shaft having a cross mounting hole to accept the mounting pin perpendicularly to the longitudinal axis of the shaft;
a fixed frame secured to a main shaft; and
a sliding frame secured to the main shaft, slidable along the main shaft toward the fixed frame and securable to the main shaft;
wherein the fixed frame and sliding frame can form a clamp to attach the mounting assembly to an object.

9. The payload support assembly of claim 1 further comprising:
a gimbal assembly having:
a payload swivel having a swivel component attached in fixed angular relationship to the payload upright;
the payload swivel component attached to a payload tilt swivel;
the payload tilt swivel attached to a gimbal rod;
the gimbal rod attached to a payload roll swivel; and
the payload roll swivel attached to a payload holder.

10. The payload support assembly of claim 9 wherein the payload holder comprises:
a turnbuckle assembly having:
an outer barrel;
a driver within the outer barrel;
a first extender at a first end of the outer barrel and a second extender at a second end of the outer barrel;
wherein the first extender is functionally connected to the driver at an inner end of the first extender and the second extender is functionally connected to the driver at an inner end of the second extender so the driver can draw the first and second extenders into and out of the outer barrel;
a turnbuckle adjustment component functionally connected to the driver to adjust the position of the first and second extenders within the outer barrel;
a first grabber attached to an outer end of the first extender and configured to hold a payload; and
a second grabber attached to an outer end of the second extender and configured to grab a payload.

11. The payload support assembly of claim 1 wherein to create a folded support assembly, the assembly further comprises:
a lateral offset in at least one fixed joint component; and
a vertical offset in at least one fixed joint component;
wherein the lateral and vertical offsets reduce overall size of the folded support assembly as compared to a like assembly without the offsets.

12. The payload support assembly of claim 1 further comprising in at least one of the first and second arm segments:
a vertical offset extending below the spar and through which the tension line passes;
a proximal horizontal offset on an upright at the proximate end of the spar;
a distal horizontal offset on an upright at the distal end of the spar;
wherein the proximal and distal horizontal offsets extend toward one another;
wherein the tension line associated with the at least one arm segment has a proximal termination point on the proximal horizontal offset and a distal termination point is on the distal horizontal offset; and
wherein the offsets are sufficient to maintain approximate parallelism throughout an excursion of the arm segment.

13. The payload support assembly of claim 1 comprising:
an aperture in at least one of the primary joint, mid joint and payload joint assemblies to accommodate cables.

14. The payload support assembly of claim 1 further comprising in at least one of the first and second arm segments, a windlass disposed at the pass-through in the spar and functionally connected to the tension line.

15. The payload support assembly of claim 14 wherein the windlass is motorized.

16. The payload support assembly of claim 1 further comprising a supplementary resilient component extending from the primary upright to the first arm segment spar to further counter weight of the payload.

17. The support assembly of claim 1 wherein in at least one of the first arm segment or the second arm segment the associated tension line extends from a termination point on a first upright attached to the spar, extends to a pivot point of the spar and an opposing second upright, extends to a pivot point of the spar and the first upright, then extends to a termination point on the second upright.

18. The support assembly of claim 1 wherein in at least one of the first arm segment or the second arm segment the associated tension line extends from a termination point on a first upright, extends to a pivot point of the spar and an opposing second upright, extends to a pivot point of the spar and the first upright, extends to the second upright and then to a termination point on the first upright.

19. A payload support assembly comprising:
the support assembly having a proximal end and a distal end;

a counterbalancing arm having:
one or more arm segments, each of the one or more arm segments having a proximal end and a distal end;
at least one of the one or more arm segments having:
a spar extending between and functionally attached to a proximal joint assembly and a distal joint assembly;
the proximal joint assembly having a proximal upright, wherein the proximal upright is rotatable with respect to the spar about an axis perpendicular to the spar and having a fixed maximum angle with respect to a fixed proximal joint component;
the distal joint assembly having a distal upright wherein the distal upright is rotatable with respect to the spar about an axis perpendicular to the spar and having a fixed maximum angle rotatable with respect to fixed distal joint component; and
a friction component located between the proximal and distal ends of the spar;
a tension line connected to the proximal upright and further connected to the distal upright and acted on by the friction component.

20. A method of creating a counterbalancing arm segment comprising:
providing an arm segment having:
a spar extending between and functionally attached to a proximal joint assembly and a distal joint assembly;
the proximal joint assembly having a proximal upright wherein the proximal upright is rotatable with respect to the spar about an axis perpendicular to the spar and in fixed maximum angular relationship to a fixed proximal joint component;
the distal joint assembly having a distal upright wherein the distal upright is rotatable with respect to the spar about an axis perpendicular to the spar and in fixed maximum angular relationship to fixed distal joint component;
a friction component located between proximal and distal ends of the spar;
a tension line connecting the proximal upright to the distal upright and acted on by the friction component;
a vertical offset extending below the spar and through which the tension line passes;
a proximal horizontal offset on an upright at the proximate end of the spar;
a distal horizontal offset on an upright at the distal end of the spar;
wherein the proximal and distal horizontal offsets extend toward one another;
wherein the tension line associated with the arm segment has a proximal termination point on the proximal horizontal offset and a distal termination point is on the distal horizontal offset; and
calculating the vertical and horizontal offsets so that approximate parallelism of the uprights is maintained throughout an excursion of the arm segment.

* * * * *